US010999864B2

(12) United States Patent
Zhang et al.

(10) Patent No.: US 10,999,864 B2
(45) Date of Patent: May 4, 2021

(54) ACKNOWLEDGEMENT FEEDBACK IN UNLICENSED NEW RADIO

(71) Applicant: QUALCOMM Incorporated, San Diego, CA (US)

(72) Inventors: Xiaoxia Zhang, San Diego, CA (US); Zhifei Fan, San Diego, CA (US); Kapil Bhattad, Bangalore (IN); Jing Sun, San Diego, CA (US); Tamer Kadous, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/806,979

(22) Filed: Mar. 2, 2020

(65) Prior Publication Data

US 2020/0205192 A1 Jun. 25, 2020

Related U.S. Application Data

(63) Continuation of application No. 16/281,828, filed on Feb. 21, 2019.

(Continued)

(51) Int. Cl.
*H04W 72/14* (2009.01)
*H04L 1/18* (2006.01)
(Continued)

(52) U.S. Cl.
CPC ........... *H04W 72/14* (2013.01); *H04L 1/1685* (2013.01); *H04L 1/1812* (2013.01);
(Continued)

(58) Field of Classification Search
None
See application file for complete search history.

(56) References Cited

U.S. PATENT DOCUMENTS

2015/0036673 A1 2/2015 Asterjadhi et al.
2015/0131494 A1 5/2015 He et al.
(Continued)

FOREIGN PATENT DOCUMENTS

EP 2693816 A1 2/2014
WO WO-2017168257 A1 10/2017

OTHER PUBLICATIONS

CATT: "Explicit HARQ and Scheduling Timing Design for LTE sTTI", 3GPP TSG RAN WG1 Meeting #87, 3GPP Draft; R1-1611360, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 5, 2016 (Nov. 5, 2016), 3 Pages, XP051189894, Retrieved from the Internet: URL: http://www.3gpp.org/ftp/tsg_ran/WG1_RL1/TSGR1_87/Docs/ [retrieved on Nov. 5, 2016] paragraphs [0002], [0003].

(Continued)

*Primary Examiner* — Diane L Lo
(74) *Attorney, Agent, or Firm* — Holland & Hart LLP/Qualcomm

(57) ABSTRACT

Methods, systems, and devices for wireless communications are described. A user equipment (UE) and a base station may communicate in an unlicensed spectrum (e.g., a shared radio frequency spectrum band). As such, the UE may determine a codebook size for transmitting hybrid access request (HARQ) acknowledgement (ACK) feedback with respect to the unlicensed spectrum. Accordingly, the UE may base the HARQ ACK codebook size on a number of HARQ processes with which the UE has been configured. Additionally or alternatively, the UE may base the HARQ ACK codebook size on a number and/or duration of downlink channel monitoring occasions indicated by the base station. In some (Continued)

cases, the UE may base the HARQ ACK codebook size on a combination of the techniques described herein.

30 Claims, 20 Drawing Sheets

Related U.S. Application Data

(60) Provisional application No. 62/648,852, filed on Mar. 27, 2018.

(51) Int. Cl.
  *H04L 5/00* (2006.01)
  *H04W 72/12* (2009.01)
  *H04L 1/16* (2006.01)

(52) U.S. Cl.
  CPC .......... *H04L 1/1854* (2013.01); *H04L 1/1861* (2013.01); *H04L 1/1864* (2013.01); *H04L 5/0055* (2013.01); *H04W 72/1289* (2013.01); *H04L 1/1822* (2013.01)

(56) References Cited

U.S. PATENT DOCUMENTS

| | | |
|---|---|---|
| 2017/0134140 A1 | 5/2017 | Park |
| 2018/0019843 A1 | 1/2018 | Papasakellariou |
| 2018/0234211 A1 | 8/2018 | Liu |
| 2018/0310257 A1* | 10/2018 | Papasakellariou .... H04W 52/08 |
| 2018/0367259 A1* | 12/2018 | Hsieh ................... H04L 1/1812 |
| 2019/0052415 A1* | 2/2019 | Nammi ................. H04L 1/1816 |
| 2019/0116489 A1 | 4/2019 | Harada et al. |
| 2019/0150122 A1* | 5/2019 | Ying ................... H04W 72/042 370/329 |
| 2019/0159251 A1 | 5/2019 | Li et al. |
| 2019/0306878 A1* | 10/2019 | Zhang ............... H04W 72/1289 |
| 2020/0059341 A1* | 2/2020 | Zhang .................. H04L 5/0023 |
| 2020/0169357 A1 | 5/2020 | Lei et al. |
| 2020/0288458 A1 | 9/2020 | Takeda et al. |

OTHER PUBLICATIONS

International Search Report and Written Opinion—PCT/US2019/019187—ISA/EPO—dated Jul. 29, 2019.
Partial International Search Report—PCT/US2019/019187—ISA/EPO—dated May 27, 2019.

* cited by examiner

ACKNOWLEDGEMENT FEEDBACK IN UNLICENSED NEW RADIO

CROSS REFERENCES

The present Application for Patent is a Continuation of U.S. patent application Ser. No. 16/281,828 by ZHANG et al., entitled "Acknowledgement Feedback In Unlicensed New Radio" filed Feb. 21, 2019, which claims the benefit of U.S. Provisional Patent Application No. 62/648,852 by ZHANG et al., entitled "Acknowledgement Feedback in Unlicensed New Radio," filed Mar. 27, 2018, assigned to the assignee hereof, and which are expressly incorporated by reference herein.

BACKGROUND

The following relates generally to wireless communication, and more specifically to acknowledgement (ACK) feedback in unlicensed New Radio (NR).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may support ACK feedback to indicate if a wireless device (e.g., a UE) successfully decodes downlink messages (i.e., data transmissions) where the downlink message decoding is based on one or more detected downlink control messages (e.g., a downlink grant or downlink control information (DCI)). Accordingly, the wireless device may determine an ACK codebook size for transmitting the ACK feedback, where the ACK codebook size may be based on the number of downlink messages included in the ACK feedback, a static or dynamic configuration for the ACK feedback, etc. In deployments supporting unlicensed spectrums (e.g., unlicensed NR), one or more downlink messages may not be received correctly and the wireless device may determine an ACK codebook size that is incorrect or inefficient for transmitting the ACK feedback.

SUMMARY

The described techniques relate to improved methods, systems, devices, or apparatuses that support acknowledgement (ACK) feedback in unlicensed New Radio (NR). Generally, the described techniques provide a user equipment (UE) with means to determine a hybrid access request (HARQ) ACK codebook size for transmitting HARQ feedback based on a duration of one or more downlink channel monitoring occasions, a number of configured HARQ processes, or a combination thereof. Additionally or alternatively, the HARQ codebook size may further be based on a number of downlink channel monitoring occasions, a set of downlink channel monitoring occasions, a total number of channels associated with the UE, a channel indication of the total number of channels, or a combination thereof. In some cases, the UE may receive a feedback trigger and then determine the HARQ ACK codebook size after receiving the feedback trigger. Additionally, the UE may populate the HARQ feedback based on an ACK delay indication, where the HARQ feedback may be populated using decoding results and/or default values based on the ACK delay. It is to be noted that various elements detailed as follows may be combined between independent claims described herein.

A method of wireless communication in a shared radio frequency spectrum band is described. The method may include receiving, at the UE, a downlink grant scheduling a downlink channel to be received by the UE, and identifying, in association with the downlink grant, an ACK delay indication, where the ACK delay indication indicates a minimum time by which hybrid access request (HARQ) feedback is to be delayed after receiving the downlink channel. The method may also include receiving, at the UE, the downlink channel, determining whether to transmit HARQ feedback for the downlink channel based on a value of the ACK delay, and transmitting the HARQ feedback based on the determining.

An apparatus for wireless communication in a shared radio frequency spectrum band is described. The apparatus may include a processor, memory in electronic communication with the processor, and instructions stored in the memory. The instructions may be executable by the processor to cause the apparatus to receive, at the UE, a downlink grant scheduling a downlink channel to be received by the UE, and identify, in association with the downlink grant, an ACK delay indication, where the ACK delay indication indicates a minimum time by which hybrid access request (HARQ) feedback is to be delayed after receiving the downlink channel. The instructions may also be executable by the processor to cause the apparatus to receive, at the UE, the downlink channel, determine whether to transmit HARQ feedback for the downlink channel based on a value of the ACK delay indication, and transmit the HARQ feedback based on the determining.

Another apparatus for wireless communication in a shared radio frequency spectrum band is described. The apparatus may include means for receiving, at the UE, a downlink grant scheduling a downlink channel to be received by the UE, and identifying, in association with the downlink grant, an ACK delay indication, where the ACK delay indication indicates a minimum time by which hybrid access request (HARQ) feedback is to be delayed after receiving the downlink channel. The apparatus may also include means for receiving, at the UE, the downlink channel, determining whether to transmit HARQ feedback for the downlink channel based on a value of the ACK delay indication, and transmitting the HARQ feedback based on the determining.

A non-transitory computer-readable medium storing code for wireless communication in a shared radio frequency spectrum band is described. The code may include instructions executable by a processor to receive, at the UE, a downlink grant scheduling a downlink channel to be received by the UE, and identify, in association with the downlink grant, an ACK delay indication, where the ACK delay indication indicates a minimum time by which hybrid access request (HARQ) feedback is to be delayed after receiving the downlink channel. The code may also include instructions executable by a processor to receive, at the UE, the downlink channel, determine whether to transmit HARQ feedback for the downlink channel based on a value of the ACK delay indication, and transmit the HARQ feedback based on the determining.

A method of wireless communication in a shared radio frequency spectrum band is described. The method may include receiving, in a downlink control information message, a channel indication for a number of channels to be included in determining a hybrid access request (HARQ) ACK codebook size, determining the HARQ ACK codebook size based on the number of channels indicated by the channel indication, and transmitting HARQ feedback in accordance with the HARQ ACK codebook size.

An apparatus for wireless communication in a shared radio frequency spectrum band is described. The apparatus may include a processor, memory in electronic communication with the processor, and instructions stored in the memory. The instructions may be executable by the processor to cause the apparatus to receive, in a downlink control information message, a channel indication for a number of channels to be included in determining a hybrid access request (HARQ) ACK codebook size, determine the HARQ ACK codebook size based on the number of channels indicated by the channel indication, and transmit HARQ feedback in accordance with the HARQ ACK codebook size.

Another apparatus for wireless communication in a shared radio frequency spectrum band is described. The apparatus may include means for receiving, in a downlink control information message, a channel indication for a number of channels to be included in determining a hybrid access request (HARQ) ACK codebook size, determining the HARQ ACK codebook size based on the number of channels indicated by the channel indication, and transmitting HARQ feedback in accordance with the HARQ ACK codebook size.

A non-transitory computer-readable medium storing code for wireless communication in a shared radio frequency spectrum band is described. The code may include instructions executable by a processor to receive, in a downlink control information message, a channel indication for a number of channels to be included in determining a hybrid access request (HARQ) ACK codebook size, determine the HARQ ACK codebook size based on the number of channels indicated by the channel indication, and transmit HARQ feedback in accordance with the HARQ ACK codebook size.

A method of wireless communication in a shared radio frequency spectrum band is described. The method may include identifying at least one downlink channel monitoring occasion, receiving, at the UE, a feedback trigger for transmission of HARQ feedback, determining a HARQ ACK codebook size based on a number of configured HARQ processes, on the downlink channel monitoring occasions, or a combination thereof, and transmitting the HARQ feedback in accordance with the HARQ ACK codebook size.

An apparatus for wireless communication in a shared radio frequency spectrum band is described. The apparatus may include a processor, memory in electronic communication with the processor, and instructions stored in the memory. The instructions may be executable by the processor to cause the apparatus to identify at least one downlink channel monitoring occasion, receive, at the UE, a feedback trigger for transmission of HARQ feedback, determine a HARQ ACK codebook size based on a number of configured HARQ processes, on the downlink channel monitoring occasions, or a combination thereof, and transmit the HARQ feedback in accordance with the HARQ ACK codebook size.

Another apparatus for wireless communication in a shared radio frequency spectrum band is described. The apparatus may include means for identifying at least one downlink channel monitoring occasion, receiving, at the UE, a feedback trigger for transmission of HARQ feedback, determining a HARQ ACK codebook size based on a number of configured HARQ processes, on the downlink channel monitoring occasions, or a combination thereof, and transmitting the HARQ feedback in accordance with the HARQ ACK codebook size.

A non-transitory computer-readable medium storing code for wireless communication in a shared radio frequency spectrum band is described. The code may include instructions executable by a processor to identify at least one downlink channel monitoring occasion, receive, at the UE, a feedback trigger for transmission of HARQ feedback, determine a HARQ ACK codebook size based on a number of configured HARQ processes, on the downlink channel monitoring occasions, or a combination thereof, and transmit the HARQ feedback in accordance with the HARQ ACK codebook size.

DETAILED DESCRIPTION

Figure 1:
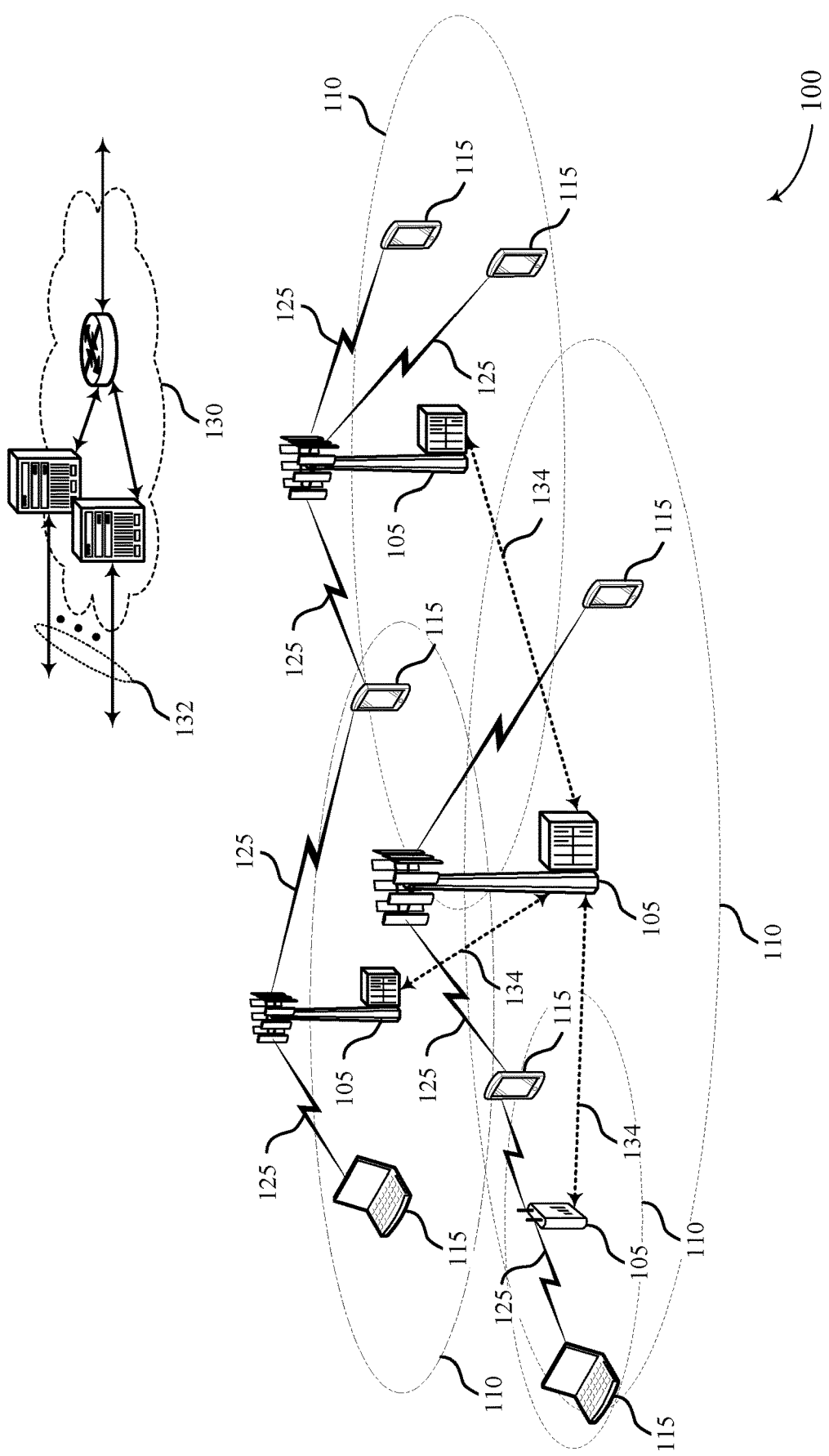
FIG. 1 illustrates an example of a system for wireless communication that supports acknowledgement (ACK) feedback in unlicensed New Radio (NR) in accordance with aspects of the present disclosure.

In some wireless communications systems (e.g., New Radio (NR)), a user equipment (UE) may utilize a hybrid access request (HARQ) acknowledgement (ACK) feedback scheme to indicate if one or more downlink data messages (e.g., physical downlink shared channel (PDSCH) messages) have been successfully received and decoded from a base station after receiving one or more downlink control messages (e.g., physical downlink control channel (PDCCH) messages). Accordingly, the UE may determine a HARQ ACK codebook size for transmitting the HARQ ACK feedback, where the HARQ ACK codebook may indicate a payload size for the HARQ ACK feedback in addition to how to populate the payload. For example, the HARQ ACK codebook may indicate that the HARQ ACK feedback includes feedback for a number of downlink data messages and/or HARQ processes with a corresponding size (e.g., number of bits) for transmitting the HARQ ACK feedback.

In some cases, the ACK codebook size may be based in part on a semi-static or dynamic configuration. Accordingly, the base station may indicate a semi-static configuration for the HARQ ACK feedback in previous signaling (e.g., a radio resource control (RRC) configuration), where the HARQ ACK feedback is based on maximum and minimum slot timing values. The slot timing values may indicate a number of slots that the UE reports HARQ ACK feedback for downlink data messages included in the corresponding slots. For example, the UE may transmit HARQ ACK feedback for downlink data messages in slots extending from the minimum indicated slot to the maximum indicated slot. Alternatively, the base station may indicate a dynamic configuration for the HARQ ACK feedback based on detected downlink messages (e.g., downlink control information (DCI)). As such, the base station may indicate one or more occasions that the UE monitors for the downlink messages. When the UE detects a downlink message triggering the HARQ ACK feedback, the UE may transmit the HARQ ACK feedback starting from a slot corresponding to the detected downlink message up to a last received downlink message. In one example of a dynamic ACK codebook determination, downlink control messages may include an indication of an ACK resource to be used corresponding to a number of data transmissions. Accordingly, the UE may determine an ACK codebook size for an ACK resource dynamically based on all downlink control messages that point to the ACK resource.

In some cases, the wireless communications system may further support communications in an unlicensed spectrum (e.g., a shared radio frequency spectrum band), licensed spectrum, or a combination of licensed and unlicensed spectrums. As such, the UE may determine an inefficient ACK codebook size for transmitting the HARQ ACK feedback. For example, techniques associated with the unlicensed spectrum (e.g., listen-before-talk (LBT)) may add to a delay time for transmitting the HARQ ACK feedback or may forego the scheduled HARQ ACK feedback transmission opportunity due to LBT failure. The HARQ ACK feedback may not be received at the base station due to unforeseen interference, one or more processes associated with the HARQ may not be appropriately received and/or decoded, or the HARQ ACK feedback may span more than one transmission opportunities (TxOps) associated with the unlicensed spectrum. Accordingly, the HARQ ACK feedback may not include feedback for one or more of the missed HARQ processes (e.g., due to interference, processing times that extend past the end of a TxOp, etc.), and the UE may determine an ACK codebook size that does not fully capture the HARQ ACK feedback. As such, it may be desirable to have mechanisms such as, for example, re-triggering HARQ ACK feedback at additional instances.

To determine an appropriate codebook size, the UE may base the ACK codebook size on a number of HARQ processes with which the UE has been configured. When the HARQ ACK feedback is triggered, the UE may transmit feedback for all of the HARQ processes. The base station may trigger the HARQ ACK feedback embedded in the downlink message (e.g., downlink or uplink grant) or in a separate downlink message (e.g., a separate DCI). If the ACK feedback for a particular HARQ process is ready when the trigger is received, the UE may transmit appropriate ACK feedback based on decoding results. Alternatively, if the ACK feedback for a particular HARQ process is not ready when the trigger is received (e.g., based on an associated ACK delay time), the UE may transmit a previous value or a default value (e.g., a negative acknowledgement (NACK)) for the particular HARQ process. In some cases, the UE may transmit the HARQ ACK feedback once per TxOp or may transmit faster the HARQ ACK feedback faster (e.g., every slot).

Additionally or alternatively, the UE may base the ACK codebook size on monitoring occasions for downlink messages (e.g., a number and/or duration of the monitoring occasions where the UE monitors for a downlink grant in predetermined slots for the monitoring occasions). For example, a control channel may be used to carry information to decode data and the ACK codebook may be a function of when the control information may potentially show up in the monitoring occasions. As such, the ACK codebook size may include ACK feedback for parts of one or more TxOps. For example, the UE may need time to process a downlink message (i.e., a downlink data transmission, PDSCH message, etc.) that extends past the end of a first TxOp. The UE may transmit ACK feedback for the downlink message with the ACK codebook size in a subsequent TxOp while skipping a gap where the base station does not have medium access in the unlicensed spectrum. Additionally, if the UE misses one or more ACK transmissions due to issues associated with the unlicensed spectrum (e.g., LBT and/or interference), the base station may request subsequent ACK feedback to include the missed ACK transmission(s).

In some cases, the UE may base the ACK codebook size on a combination of the techniques described herein. For example, the base station may indicate one or more monitoring occasions for the UE to utilize for monitoring downlink control information or other data (e.g., DCI) for ACK feedback on the corresponding downlink data transmission within one TxOp. Additionally, if the ACK feedback extends into a second TxOp, the base station may trigger (e.g., in a downlink or uplink grant or separate DCI) the UE to transmit ACK feedback for a number (or a subset) of configured HARQ processes for the UE. As such, the UE may determine the ACK codebook size accordingly based on the type of ACK feedback indicated by the base station. Additionally or alternatively, the UE may base the ACK codebook size on a number of channels the UE is configured to communicate on. The number of channels may be based on a number of channels indicated for the UE (e.g., active channels or a subset thereof).

Aspects of the disclosure are initially described in the context of wireless communications systems. Additional aspects of the disclosure are then described with respect to ACK feedback schedules and schemes, monitoring schemes, and a process flow. Aspects of the disclosure are further illustrated by and described with reference to apparatus diagrams, system diagrams, and flowcharts that relate to ACK feedback in unlicensed NR.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize licensed radio frequency spectrum bands, unlicensed radio frequency spectrum bands, or a combination of licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.)

at reduced symbol durations (e.g., 16.67 microseconds). A TTI in eCC may consist of one or multiple symbol periods. In some cases, the TTI duration (e.g., the number of symbol periods in a TTI) may be variable.

Wireless communications systems such as an NR system may utilize any combination of licensed, shared, unlicensed spectrum bands, or a combination of the different spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As described herein, HARQ feedback may be utilized to increase the likelihood that data is received correctly over a communication link 125. In some cases, the HARQ feedback may include an indication of whether the data is received correctly, where a UE 115 may transmit an ACK/NACK message to a base station 105 based on a successful detection and decoding of an amount of the data (e.g., ACK if successful, NACK if unsuccessful). Further, the UE 115 may transmit this ACK feedback according to a HARQ ACK codebook size (e.g., ACK/NACK payload size and how to populate the ACK/NACK payload), where the HARQ ACK codebook size is based in part on a semi-static or dynamic configuration for the ACK feedback, which may indicate an amount of data to be represented by the ACK feedback (e.g., a number of downlink messages). The base station 105 may indicate the configuration to the UE 115 via high layer signaling (e.g., RRC).

Figure 2A:
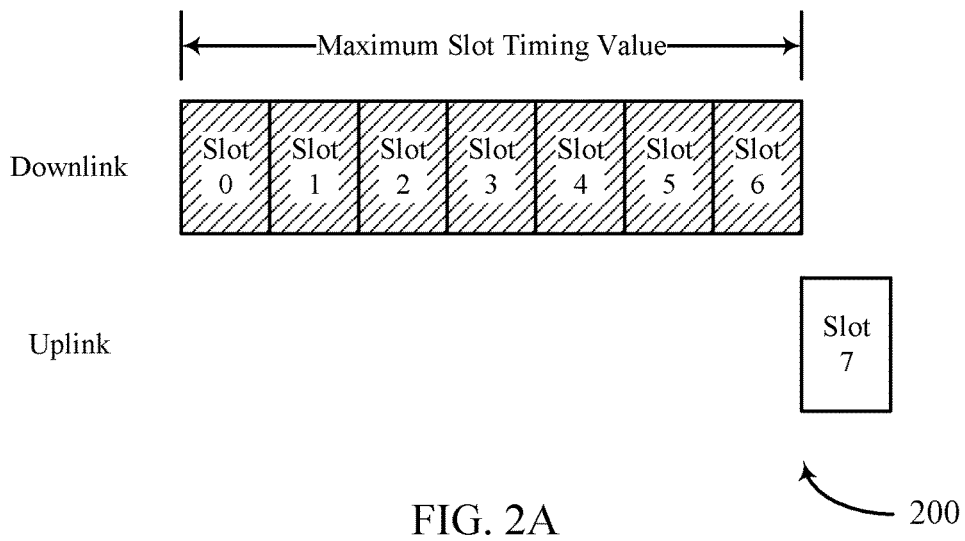
FIGS. 2A, 2B, and 2C illustrate examples of ACK feedback timelines that support ACK feedback in unlicensed NR in accordance with aspects of the present disclosure.
Figure 2B:
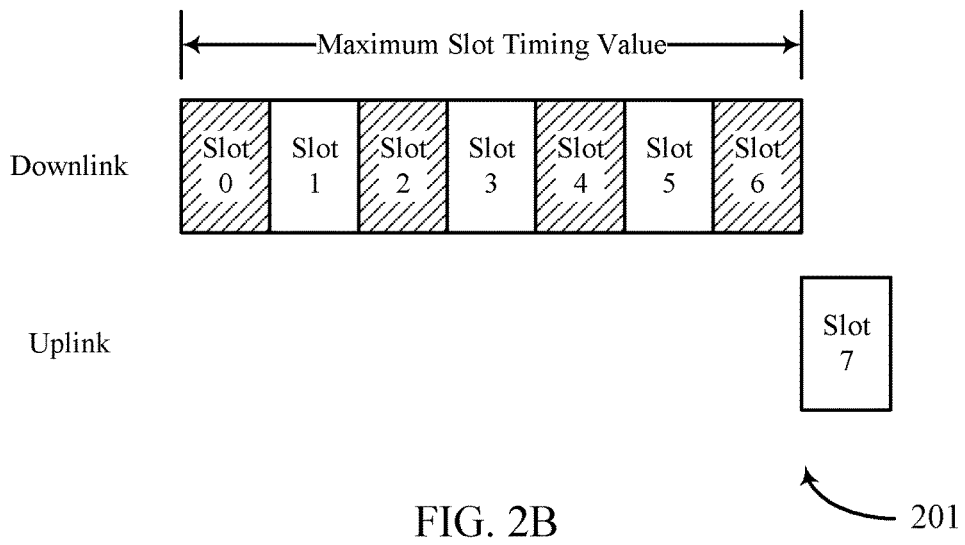
Figure 2C:
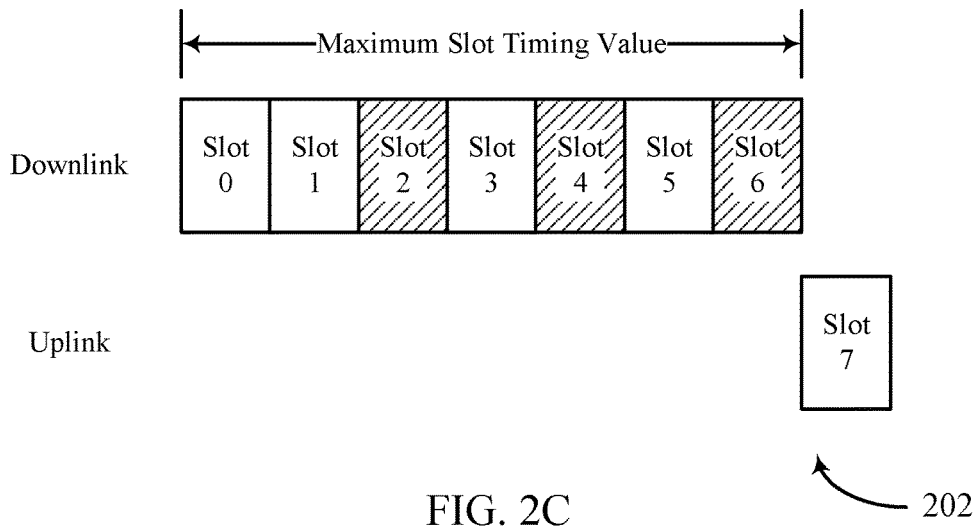

FIGS. 2A, 2B, and 2C illustrate examples of ACK feedback timelines 200, 201, and 202, respectively, that support ACK feedback in unlicensed NR in accordance with various aspects of the present disclosure. In some examples, ACK feedback timelines 200, 201, and 202 may implement aspects of wireless communication system 100. A UE 115 may receive one or more downlink data transmissions (e.g., PDSCH) and/or downlink control transmissions (e.g., PDCCH) from a base station 105 and transmit ACK feedback for the one or more downlink transmissions in an uplink transmission (e.g., physical uplink control channel (PUCCH)) to the base station 105, where the UE 115 and the base station 105 may be examples of corresponding devices as described with reference to FIG. 1. In some cases, the UE 115 may, for example, transmit the ACK feedback in accordance with a HARQ ACK codebook size, as described herein, where the HARQ ACK codebook size may be based on a semi-static or dynamic configuration.

In ACK feedback timeline 200, when the UE 115 is configured with a semi-static HARQ ACK codebook size, the UE 115 may determine a number (M) of downlink control channel (e.g., PDCCH) monitoring occasion(s) for the downlink control channel based on maximum and minimum slot timing values provided to the UE 115 by the base station 105, where the maximum and minimum slot timing values may be based on processing time for ACK feedback for the UE 115 (e.g., included in a UE capability report to the base station 105). For example, the base station may indicate downlink channel monitoring occasions (e.g., downlink control channel monitoring occasions and/or downlink data channel monitoring occasions) for the UE 115 in each slot of a frame. Accordingly, the UE 115 may then transmit a corresponding HARQ ACK codebook in a same PUCCH based on the monitoring occasions extending from the minimum slot time up to the maximum slot time. For example, as shown, for a minimum slot timing value of one (1) and a maximum slot timing value of seven (7) and monitoring occasions in each slot, the UE 115 may transmit ACK feedback according to a HARQ ACK codebook for slots zero (0) to six (6) in slot seven (7) after receiving a trigger for the ACK feedback in slot six (6).

Alternatively, in ACK feedback timeline 201, for a semi-static HARQ ACK codebook size and a minimum slot timing value of one (1) and a maximum slot timing value of seven (7) and monitoring occasions in each even numbered slot, the UE 115 may transmit ACK feedback according to a HARQ ACK codebook for the even numbered slots up to six (e.g., slots 0, 2, 4, and 6) in slot seven (7) after receiving a trigger (e.g., a downlink grant) for the ACK feedback in slot six (6). If no trigger is received, the UE 115 may not transmit ACK feedback for the one or more slots. Accordingly, the ACK codebook may be a function of M in this case. Each time the UE 115 receives a downlink grant (e.g., the trigger), the UE 115 may report the ACK feedback based on the above description, unless the UE 115 does not receive a downlink grant.

The determination for M may be based on a monitoring periodicity for the downlink control channel, a monitoring offset for the downlink control channel, and a monitoring pattern for the downlink control channel within a slot for each control resource set in a set of control resource sets configured to the UE 115. For a serving cell (e.g., cell in the base station 105) and for a HARQ ACK codebook determination, the downlink channel monitoring occasions may be indexed in an ascending order in time. Additionally, for a given downlink channel monitoring occasion, the UE 115 may determine ACK feedback for all serving cells.

In some cases, the ACK feedback sent on uplink may include the ACK feedback for all slots within the codebook size determination window. However, in other cases, each DCI may include a pointer to an ACK resource (e.g., an ACK resource indicator). The ACK codebook size may still be based on all slots that are may be included within the codebook size determination window (which may include DCI that point to the ACK resources, other slots that may not have DCI detected, or slots that may have DCI pointed to another ACK resource). The ACK feedback for slots whose DCI points to the ACK resource may be set per PDSCH decoding status, while ACK feedback for rest of the slots may be set to a fixed value such as in NACK. Enhancements to the HARQ feedback process may allow the UE 115 to switch between the above two methods of HARQ ACK feedback based on for example, an explicit indication in the DCI or an implicit indication based on some other parameters in the DCI. An example of an implicit indication may include an indication that the value M for a codebook size determination is determined through the DCI in addition to an RRC configuration. In examples where the value M in the DCI differs from the value for M configured through RRC, the UE 115 may use an explicit indication. In further examples where the value M in the DCI is the same as the value for M configured through RRC, the UE 115 may use an implicit indication.

In some cases, an indication of carriers, a number of carriers, and a window size for which the ACK feedback is requested may be jointly coded with an ACK resource indicator (e.g., the pointer to an ACK resource included in a DCI). The UE 115 may receive this joint coding based on a higher number of bits for the ACK resource indicator or with a same bits utilized for the ACK resource indicator. For example, a mapping may be performed from the ACK resource indicator to both the ACK resource and the window size, where the mapping is indicated to the UE 115 during an RRC configuration. Additionally or alternatively, the mapping may be implicit. For example, a larger ACK resource (e.g., as indicated by the ACK resource indicator) may correspond to a larger window size for the ACK feedback.

Alternatively, in ACK feedback timeline 202, when the UE 115 is configured with a dynamic HARQ ACK codebook size, a value of a counter downlink assignment indicator (DAI) field in a downlink message (e.g., DCI) may denote an accumulative number (e.g., a total DAI) of serving cell/downlink channel monitoring occasion-pair(s) up to a current serving cell and current downlink channel monitoring occasion, first in increasing order of serving cell index and then in increasing order of downlink channel monitoring occasion index (m), where 0≤m<M. The downlink channel monitoring occasions may be either downlink data channel monitoring occasions or downlink control channel monitoring occasions. The UE 115 may determine the value of M to be similar to the semi-static HARQ ACK codebook, except the maximum slot timing value may be replaced by the slot timing value indicated in a first downlink message the UE 115 detects, and the minimum slot timing value may be replaced by the slot timing value indicated in a last downlink message the UE 115 detects and for which the UE 115 transmits ACK feedback in a same PUCCH. For example, for a minimum slot timing value of one (1) and a maximum slot timing value of seven (7) and monitoring occasions in each even numbered slot, the first downlink message may be received in slot two (2). As such, the UE 115 may transmit ACK feedback for slots 2, 4, and 6 after receiving a trigger (e.g., a downlink grant) for the ACK feedback in slot six (6).

The value of the total DAI in the downlink messages (e.g., DCI) may denote a total number of serving cell/downlink channel monitoring occasion-pair(s) in which downlink shared channel (e.g., physical downlink shared channel (PDSCH)) reception(s) associated with the downlink messages are present up to the current downlink channel monitoring occasion m and may be updated from downlink channel monitoring occasion to downlink channel monitoring occasion. Accordingly, the HARQ ACK codebook may be a function of M, the counter DAI, and the total DAI in this case. Additionally or alternatively, the HARQ ACK feedback size for a particular ACK resource may be based on DCIS that point to the ACK resource. In an example of HARQ feedback, DCIS on slots 1, 2, 4, and 6 may point to slots 7, 8, 7, and 7, respectively. The HARQ feedback on slot 7 would include HARQ feedback for DCIS received on slot 1, 4, and 6 while HARQ feedback on slot 8 would include HARQ feedback for DCI on slot 2. In this example, the counter DAI and total DAI indicated in the DCIS may be maintained and incremented separately for DCIS corresponding to ACK feedback in slots 7 and 8, respectively.

The counter DAI may increase in accordance with a cell index, as well as with the downlink channel monitoring occasion. Additionally or alternatively, the total DAI may denote the total number of serving cell/downlink channel monitoring occasion-pair(s) up to a current serving cell and current downlink channel monitoring occasion. For example, in an exemplary case with two (2) serving cells and two (2) downlink channel monitoring occasions, on the first downlink channel monitoring occasion, the downlink control channel (e.g., PDCCH) for a first serving cell may indicate a counter DAI of one (1) and a total DAI of two (2) and the downlink control channel for a second serving cell may indicate a counter DAI of two (2) and a total DAI of two (2). On the second PDCCH monitoring occasion, the downlink control channel for the first serving cell may indicate a counter DAI of three (3) and a total DAI of four (4) and the downlink control channel for the second serving cell may indicate a counter DAI of four (4) and a total DAI of four (4). As such, the HARQ ACK codebook is a function of M, the counter DAI, and the total DAI for each cell in each downlink channel monitoring occasion.

In some cases, a wireless communications system may support communications in an unlicensed spectrum (e.g., unlicensed NR or a shared radio frequency spectrum band), a licensed spectrum, or a combination of the unlicensed and licensed spectrums. As such, a UE 115 may determine a HARQ ACK codebook size for transmitting the ACK feedback with respect to the unlicensed spectrum. For example, attempting to communicate in the unlicensed spectrum may lead to missed ACK feedback transmissions due to interference or LBT issues or due to a processing time associated with the ACK feedback extending past the end of a TxOp (e.g., access to the unlicensed spectrum is no longer available until a subsequent TxOp occurs). Accordingly, the UE 115 may base the HARQ ACK codebook size on a number of HARQ processes with which the UE 115 has been configured. When the ACK feedback is triggered, the UE 115 may transmit feedback for all of the HARQ processes, where the feedback may include a previous value, a default value, or a new value based on when a processing time for the ACK feedback finishes compared to when the trigger is received. Additionally or alternatively, the UE 115 may base the ACK codebook size on downlink channel monitoring occasions. In some cases, the UE 115 may base the ACK codebook size on a combination of the techniques described herein.

Figure 3:
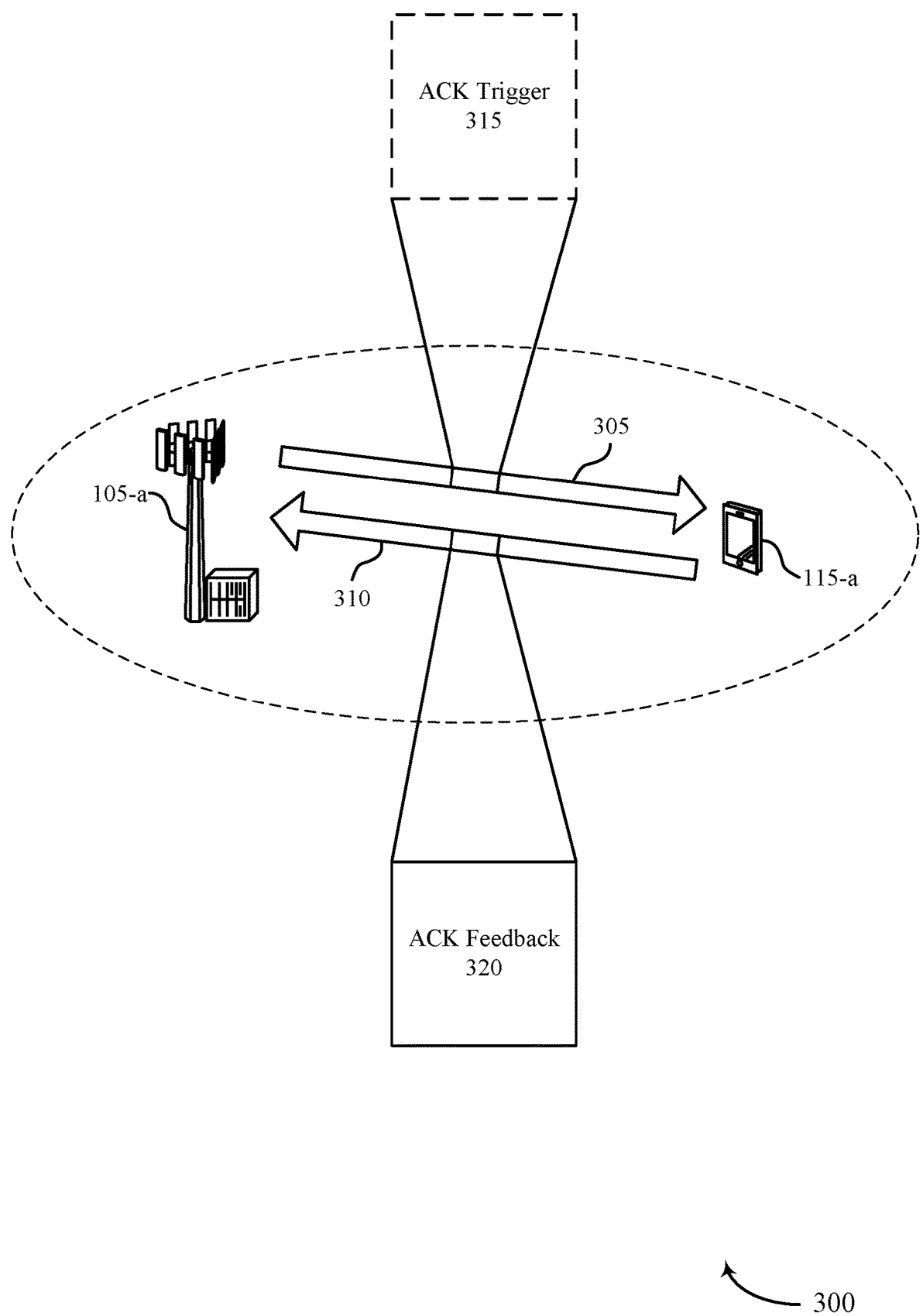
FIG. 3 illustrates an example of a wireless communications system that supports ACK feedback in unlicensed NR in accordance with aspects of the present disclosure.

FIG. 3 illustrates an example of a wireless communications system 300 that supports ACK feedback in unlicensed NR in accordance with various aspects of the present disclosure. In some examples, wireless communications system 300 may implement aspects of wireless communication system 100. Wireless communications system 300 may include a base station 105-*a* and a UE 115-*a*, which may be examples of corresponding base stations 105 and UEs 115 as described with reference to FIGS. 1 and 2.

As described herein, base station 105-*a* and UE 115-*a* may communicate in an unlicensed spectrum (e.g., a shared radio frequency spectrum band) and may employ HARQ ACK feedback techniques to indicate whether data has been received correctly at UE 115-*a*. For example, base station 105-*a* may transmit one or more downlink messages to UE 115-*a* on resources of a carrier 305. Accordingly, UE 115-*a* may transmit an indication of whether the one or more downlink messages were received and decoded correctly on resources of a carrier 310. In some cases, carriers 305 and 310 may be the same carrier. Additionally, base station 105-*a* may transmit an ACK trigger 315 on carrier 305, where UE 115-*a* responds with ACK feedback 320 on carrier 310. ACK trigger 315 may be included in a downlink or uplink grant (e.g., downlink message such as PDCCH), or UE 115-*a* may be explicitly triggered to transmit ACK feedback 320 (e.g., in a separate DCI message).

In some cases, ACK trigger 315 may be jointly coded with a delay field (e.g., a time between receiving a downlink message and ACK feedback 320 should be ready from UE 115-*a*). As such, a value for the delay field may indicate ACK trigger 315 is not present (e.g., delay field value equals zero (0), a largest delay value, or some other reserved delay value) when zero delay is not supported by UE 115-*a* or that a feedback time associated with the value is beyond the end of a current TxOp. When ACK trigger 315 is present, UE 115-*a* may be indicated, by base station 105-*a*, to report ACK feedback 320 based on one or more downlink channel monitoring occasions (e.g., a duration and/or number of downlink data channel monitoring occasions or downlink control channel monitoring occasions) or based on configured HARQ processes for UE 115-a.

If ACK feedback 320 is based on configured HARQ processes for UE 115-a, base station 105-a may indicate ACK feedback 320 is to be transmitted for all or a subset of the configured HARQ processes for UE 115-a. Each HARQ process may include a corresponding code block group/transport block level ACK bits based on its configuration. In some cases, UE 115-a may be explicitly triggered by ACK trigger 315 for ACK feedback 320 along with an indication of a particular TTI (e.g., slot, symbol, etc.) for transmitting ACK feedback 320. Additionally, an ACK delay may be indicated in a downlink grant (e.g., embedded in ACK trigger 315 or by a separate DCI). While the ACK delay in the downlink grant may not implicitly trigger ACK feedback 320, it may determine how UE 115-a populates fields for ACK feedback 320. For example, UE 115-a may determine an ACK ready time based on the ACK delay and the downlink grant (e.g., a PDSCH transmission) for each HARQ process. Accordingly, if the ACK ready time occurs before UE 115-a receives ACK trigger 315 (or is similarly triggered), UE 115-a may populate the fields for ACK feedback 320 based on decoding results for the corresponding HARQ process (e.g., ACK if successfully decoded, NACK if unsuccessfully received/decoded). Alternatively, if the ACK ready time extends past the time UE 115-a is triggered for ACK feedback 320, UE 115-a may populate the corresponding fields for ACK feedback 320 with previous values for the HARQ process or with a default value (e.g., ACK or NACK). Base station 105-a may accordingly interpret if the fields for each HARQ process are based on decoding results, previous values, or default values by comparing the ACK delay for each HARQ process with the timeline that ACK feedback 320 was received.

Alternatively, if ACK feedback 320 is based on downlink channel monitoring occasion(s), base station 105-a may further indicate a number of downlink channel monitoring occasion(s) for which UE 115-a transmits ACK feedback 320. In some cases, the downlink channel monitoring occasion(s) may be based on time locations for ACK feedback 320. Additionally, the downlink channel monitoring occasions may extend across one or more TxOps, such that ACK feedback for downlink messages in a first TxOp that UE 115-a was not able to process completely may be transmitted in ACK feedback 320 of a subsequent TxOp. As such, UE 115-a may skip gaps between the two TxOps for the ACK feedback where base station 105-a does not have access to the unlicensed spectrum. In order to transmit the ACK feedback for the first TxOp in the subsequent TxOP, UE 115-a may receive an indication on the start of the subsequent TxOp and/or at the end of the previous TxOP to determine the downlink channel monitoring occasions of the corresponding TxOp.

In some cases, UE 115-a may determine a HARQ ACK codebook size for transmitting ACK feedback 320 based on a number of downlink channel monitoring occasions and/or a configured HARQ processes. For example, base station 105-a may trigger UE 115-a to send ACK feedback 320 based on downlink channel monitoring occasions in some instances. Alternatively, in some other instances, base station 105-a may trigger UE 115-a to send ACK feedback 320 based on the configured HARQ processes. Additionally, base station 105-a may further indicate which ACK feedback (e.g., based on the downlink channel monitoring occasions or based on the configured HARQ processes) is used within the trigger. Additionally or alternatively, communications between base station 105-a and UE 115-a may include multiple channels (e.g., on one or more subbands of carriers 305 and/or 310), and the HARQ ACK codebook size may be further based on the number of channels or a number of indicated channels (e.g., active channels, subset of active channels, or checked out channels). Base station 105-a may transmit the indicated channels embedded in a downlink grant, included in a trigger downlink control information, included in a common PDCCH, included in a layer 1 (L1) channel, or included in a preamble, where UE 115-a transmits the ACK feedback for the indicated channels.

Figure 4:
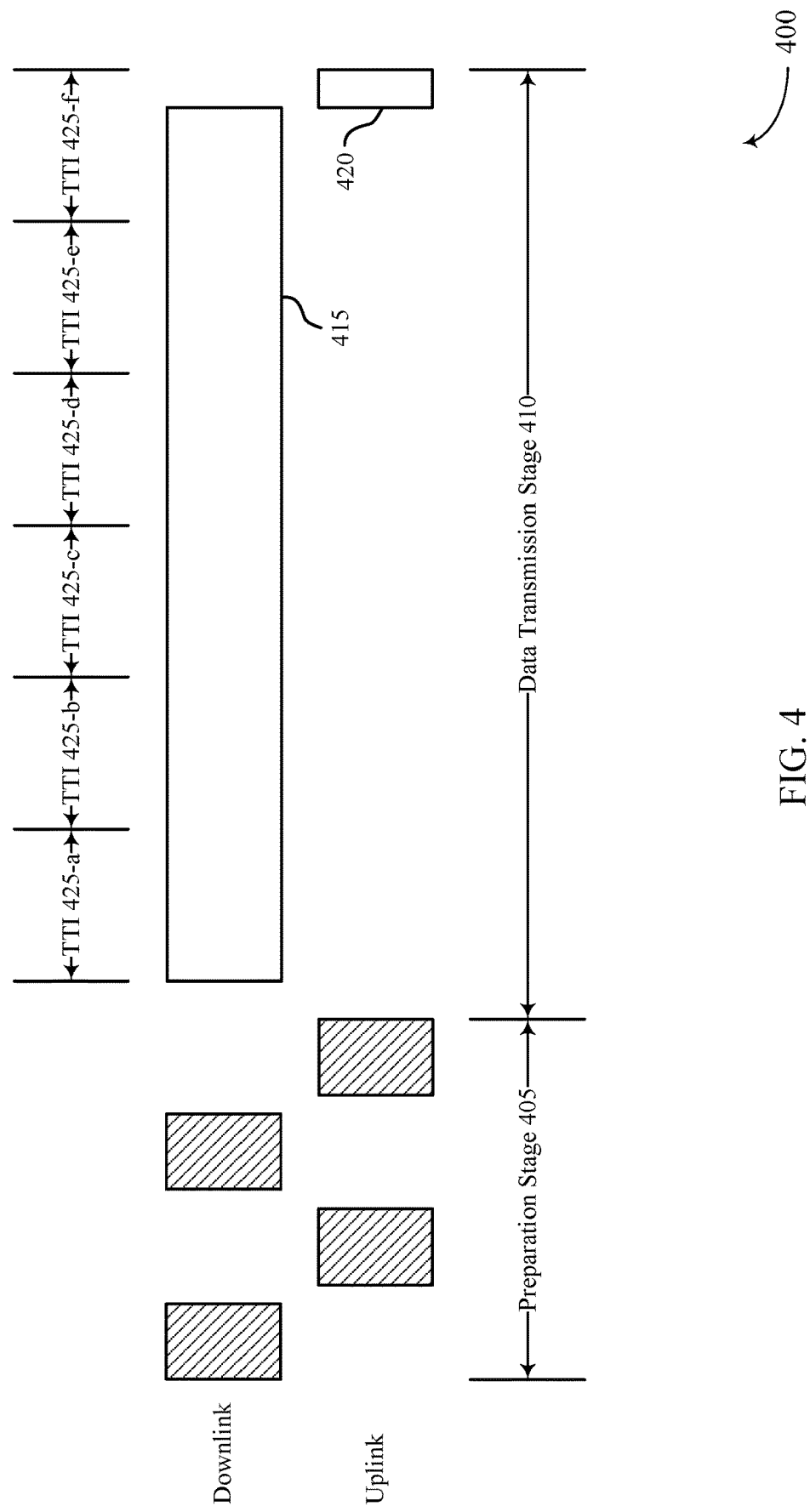
FIGS. 4 and 5 illustrate examples of ACK feedback schedules in unlicensed NR in accordance with aspects of the present disclosure.

FIG. 4 illustrates an example of an ACK feedback schedule 400 that supports ACK feedback in unlicensed NR in accordance with various aspects of the present disclosure. In some examples, ACK feedback schedule 400 may implement aspects of wireless communications systems 100 and/or 300. ACK feedback schedule 400 may include downlink and uplink transmissions between a base station 105 and a UE 115 for HARQ ACK feedback, where the base station 105 and UE 115 are examples of corresponding devices as described with reference to FIGS. 1-3. As described herein, ACK feedback schedule 400 may further include ACK feedback transmitted according to a HARQ ACK codebook size based on, for example, a number of configured HARQ processes for the UE 115.

The base station 105 and UE 115 may first transmit one or more downlink and uplink messages in a preparation stage 405 to establish a connection between the two wireless devices (e.g., random access channel (RACH) messaging, RRC configurations, etc.). The base station 105 and UE 115 may then enter a data transmission stage 410, which includes a set of downlink transmissions 415 and an uplink transmission 420, where data transmission stage 410 includes a number of TTIs 425 (e.g., slots). The set of downlink transmissions 415 may include one or more downlink messages (e.g., DCI, PDCCH, downlink grants, PDSCH, etc.), and the UE 115 may transmit ACK feedback in the uplink transmission 420 for the one or more of downlink messages according to the HARQ ACK codebook size based on the number of configured HARQ processes. In some cases, the UE 115 may transmit a block ACK feedback in situations such as in response to the set of downlink transmissions 415 from the base station 105. Accordingly, the base station 105 may reduce feedback overhead from the UE 115 by triggering the UE 115 to transmit the ACK feedback for all configured HARQ processes once during a TxOp, and after the set of downlink transmissions 415 are finished within the TxOp.

For example, the HARQ ACK codebook size may be based on 16 configured HARQ processes for the UE 115 (e.g., HARQ0 to HARQ15). As such, when the base station 105 triggers the UE 115 to send the ACK feedback after the set of downlink transmissions 415 are finished, the UE 115 may send ACK feedback for all 16 HARQ processes, where the first field of the HARQ ACK codebook indicates ACK feedback for HARQ0 and the last field indicates ACK feedback for HARQ15. The size of each field may depend on a configuration from the base station 105. If the UE 115 does not detect any data for a particular HARQ process, the UE 115 may populate the corresponding field with a default value, previous value determined for the HARQ process, etc. In some cases, the base station 105 may indicate for the UE 115 to transmit the ACK feedback more frequently (e.g., in each TTI 425).

Figure 5:
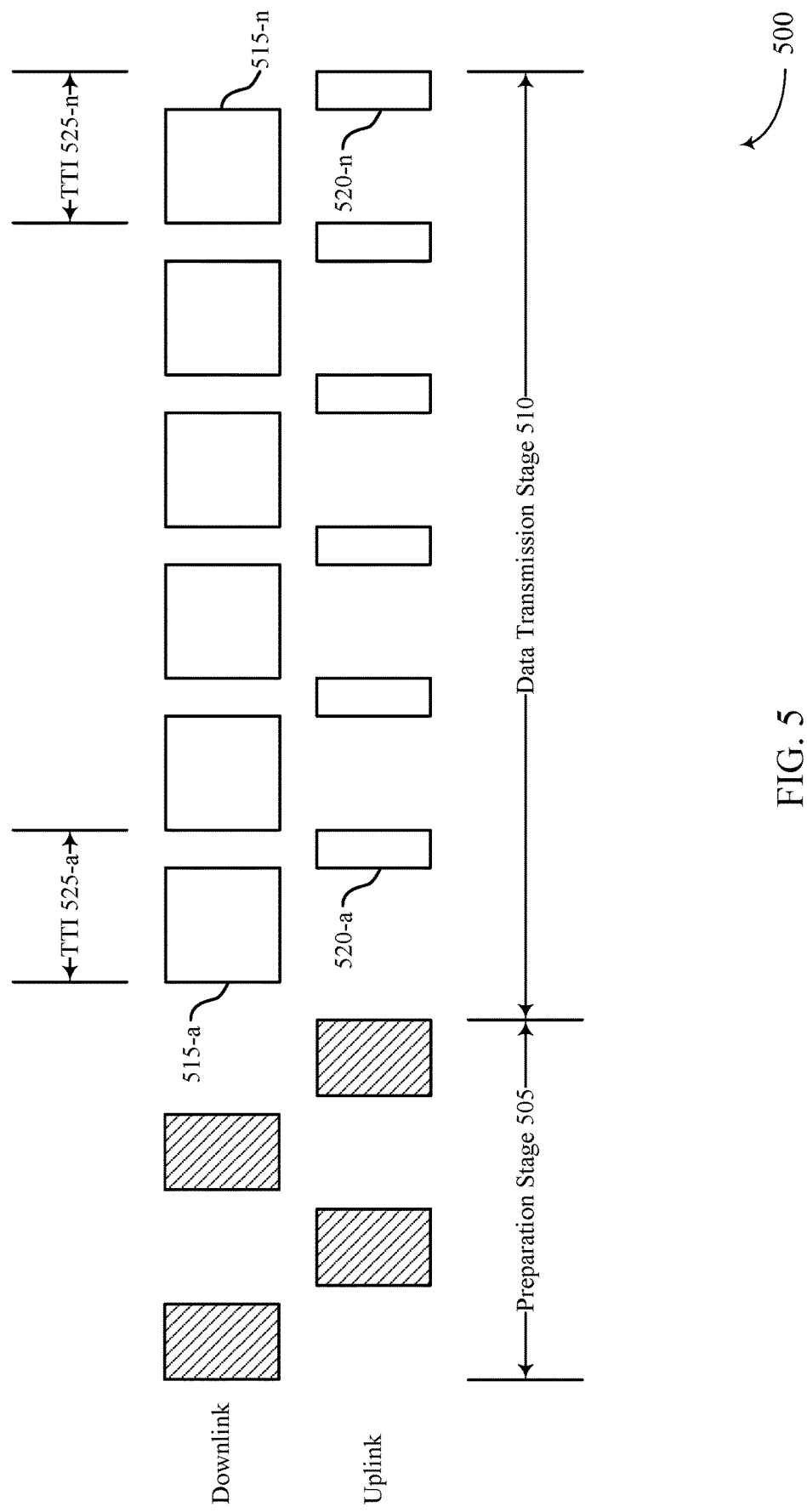

FIG. 5 illustrates an example of an ACK feedback schedule 500 that supports ACK feedback in unlicensed NR in accordance with various aspects of the present disclosure. In some examples, ACK feedback schedule 500 may implement aspects of wireless communications systems 100 and/or 300. ACK feedback schedule 500 may include downlink and uplink transmissions between a base station 105 and a UE 115 for HARQ ACK feedback, where the base station 105 and UE 115 are examples of corresponding devices as described with reference to FIGS. 1-4. As described herein, similar to ACK feedback schedule 400, ACK feedback schedule 500 may further include ACK feedback transmitted according to a HARQ ACK codebook size based on, for example, a number of configured HARQ processes for the UE 115.

Alternatively to transmitting the ACK feedback once per a TxOp (e.g., after a set of downlink transmissions are finished within the TxOp), the UE 115 may receive a trigger (e.g., in a separate DCI or embedded in a downlink grant) to transmit ACK feedback for one or more downlink messages 515 in uplink messages 520 within a corresponding TTI 525 (e.g., a slot). For example, within TTI 525-a, the UE 115 may receive a trigger in downlink message 515-a and transmit ACK feedback for all configured HARQ processes in uplink message 520-a. Data transmission stage 510 of the TxOp may include a number of TTIs 525 up to TTI 525-n with a corresponding downlink message 515-n and uplink message 520-n. Accordingly, within each TTI 525, if a trigger is not received in a downlink control portion associated with the corresponding downlink message 515, the UE 115 may not transmit ACK feedback for the configured HARQ processes in the corresponding uplink message 520. More frequent ACK feedback may allow faster outer loop adaptation for better link efficiency between the UE 115 and the base station 105.

As described herein, the base station 105 may configure the UE 115 with a number of HARQ processes (e.g., 16 processes or less), where the UE 115 reports ACK feedback for each HARQ process such that the HARQ ACK codebook size is based on the number of configured HARQ processes. As such, each time the base station 105 triggers the UE 115 to transmit the ACK feedback (e.g., in every TTI 525 as described with reference to FIG. 5), the UE 115 may report the corresponding ACK feedback for each HARQ process determined up until the trigger in a sequential field order. If the UE 115 does not detect any data for a particular HARQ process, the UE 115 may populate the corresponding field with a default value, previous value determined for the HARQ process, etc. In some cases, processing time for the ACK feedback may extend past the end of the TxOp such that default or previous values for one or more of the HARQ processes may be transmitted rather than values based on decoding results.

Figure 6:
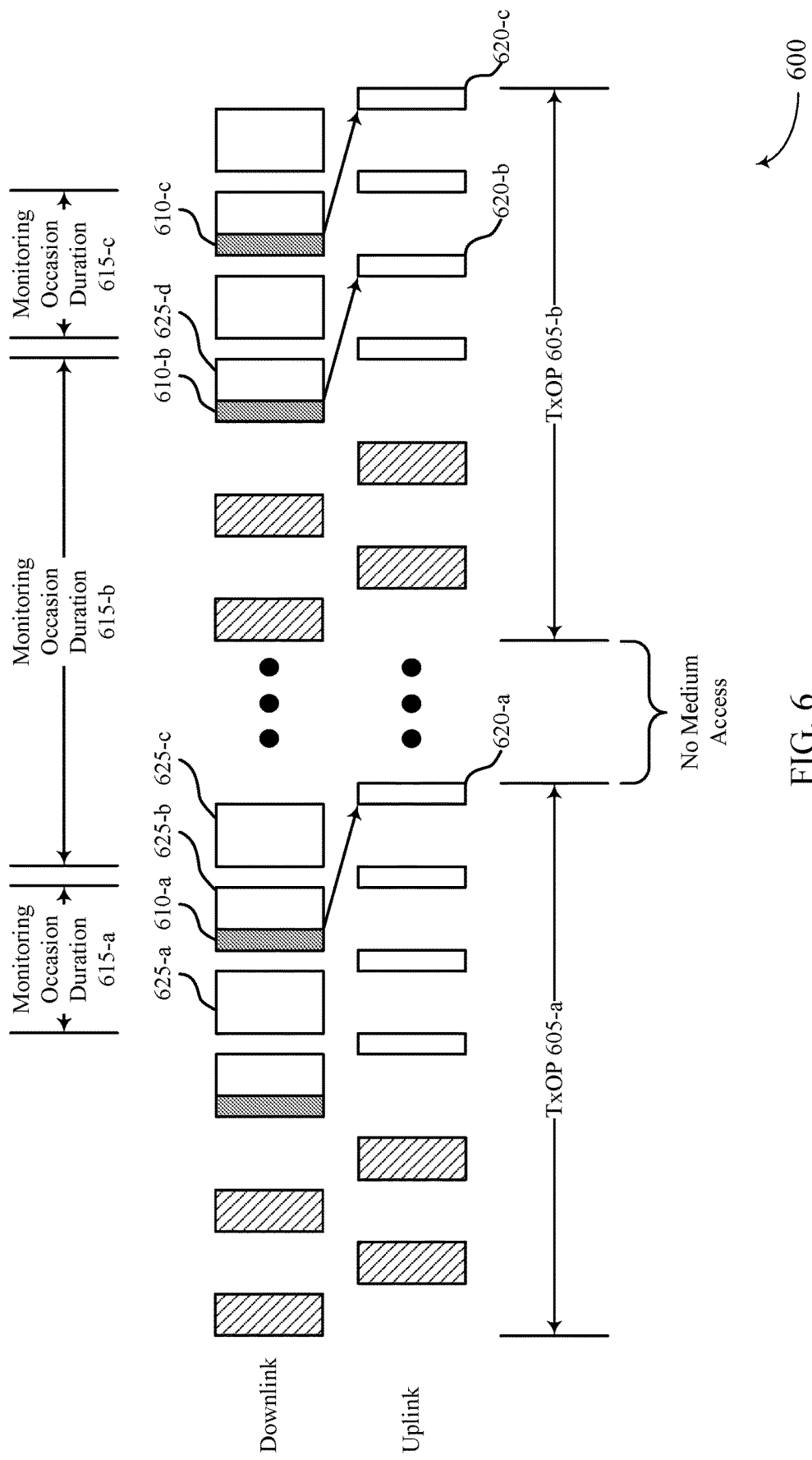
FIG. 6 illustrates an example of a downlink monitoring scheme that supports ACK feedback in unlicensed NR in accordance with aspects of the present disclosure.

FIG. 6 illustrates an example of a downlink monitoring scheme 600 that supports ACK feedback in unlicensed NR in accordance with various aspects of the present disclosure. In some examples, downlink monitoring scheme 600 may implement aspects of wireless communications systems 100 and/or 300. Downlink monitoring scheme 600 may include downlink and uplink transmissions between a base station 105 and a UE 115 for HARQ ACK feedback, where the base station 105 and UE 115 are examples of corresponding devices as described with reference to FIGS. 1-5. As described herein, downlink monitoring scheme 600 may further include ACK feedback transmitted according to a HARQ ACK codebook size based on, for example, downlink channel monitoring occasions. The downlink channel monitoring occasions may be either downlink data channel monitoring occasions or downlink control channel monitoring occasions.

The base station 105 and UE 115 may communicate across one or more TxOps 605, where a span of no medium access may occur between the TxOps such that the base station 105 may not access resources of an unlicensed spectrum. Additionally, the base station 105 may configure one or more downlink channel monitoring occasions 610 with a corresponding monitoring occasion duration 615, where the UE 115 may transmit ACK feedback in an uplink message 620 associated with downlink channel monitoring occasion 610. For example, downlink channel monitoring occasion 610-a may include control information for the UE 115 to transmit ACK feedback in uplink message 620-a for corresponding downlink messages 625 within monitoring occasion duration 615-a (e.g., downlink messages 625-a and 625-b). As shown, monitoring occasion duration 615-a may include two (2) slots, where the duration may be based on a maximum slot timing value of two (2) signaled by the base station 105 for the UE 115. Accordingly, the UE 115 may determine the HARQ ACK codebook size based on the number of downlink channel monitoring occasions 610.

In some cases, the base station 105 may indicate to the UE 115 on the start and/or end of a TxOp 605 to determine a number of downlink channel monitoring occasions 610 for the HARQ ACK codebook size and to determine when the downlink channel monitoring occasions 610 start in each TxOp 605 and where the previous TxOP ends. For example, the base station 105 may include control information in downlink channel monitoring occasion 610-b for the UE 115 to transmit ACK feedback in uplink message 620-b for corresponding downlink messages 625 within monitoring occasion duration 615-b, where monitoring occasion duration 615-b spans multiple downlink messages 625 across TxOp 605-a and TxOp 605-b (e.g., downlink messages 625-c and 625-d). By knowing the start of TxOp 605-b and end of TxOp 605-a, the UE 115 may detect downlink channel monitoring occasion 610-b and transmit the ACK feedback for the corresponding downlink messages in both TxOps 605. As such, the UE 115 may additionally determine the HARQ ACK codebook size based on skipping the gap between TxOp 605-a and TxOp 605-b, where the base station 105 may not have access to the unlicensed medium. That is, the UE 115 may monitor the downlink control channel (e.g., PDCCH) during the gap, but the downlink channel monitoring occasions during the gap may not be included in the HARQ ACK codebook.

When transmitting the ACK feedback according to the HARQ ACK codebook size for each downlink channel monitoring occasion 610, the UE 115 may transmit an ACK feedback for each downlink message 625 associated with the corresponding downlink channel monitoring occasion 610. For example, if the base station 105 triggers the UE 115 to transmit ACK feedback in downlink channel monitoring occasion 610-b, the UE 115 may include ACK feedback for downlink channel monitoring occasion 610-a (e.g., including downlink message 625-a and downlink message 625-b) and for downlink channel monitoring occasion 610-b (e.g., including downlink message 625-c and downlink message 625-d) according to the determined HARQ ACK codebook. Additionally, in some cases, interference or issues stemming from communicating in the unlicensed spectrum may result in the UE 115 missing ACK transmissions corresponding to a downlink channel monitoring occasion 610.

Figure 7:
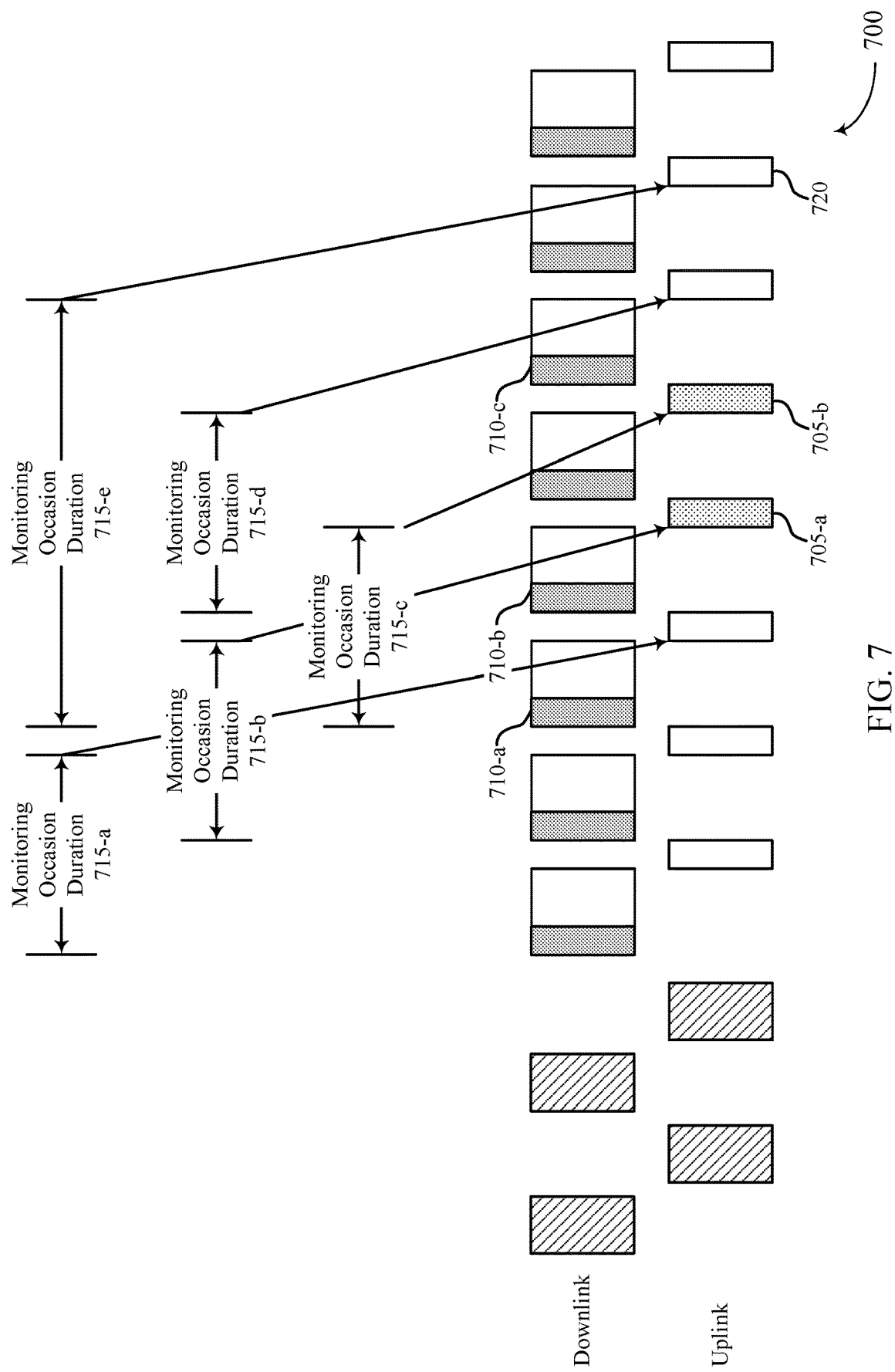
FIG. 7 illustrates an example of an adjusted ACK feedback schedule that supports ACK feedback in unlicensed NR in accordance with aspects of the present disclosure.

FIG. 7 illustrates an example of an adjusted ACK feedback schedule 700 that supports ACK feedback in unlicensed NR in accordance with various aspects of the present disclosure. In some examples, adjusted ACK feedback schedule 700 may implement aspects of wireless communications systems 100 and/or 300. ACK feedback schedule 700 may include downlink and uplink transmissions between a base station 105 and a UE 115 for HARQ ACK feedback, where the base station 105 and UE 115 are examples of corresponding devices as described with reference to FIGS. 1-6. As described herein, similar to downlink monitoring scheme 600, ACK feedback schedule 700 may further include ACK feedback transmitted according to a HARQ ACK codebook size based on, for example, downlink channel monitoring occasions. The downlink channel monitoring occasions may be either downlink data channel monitoring occasions or downlink control channel monitoring occasions.

In some cases, the UE 115 may miss one or more ACK transmissions due to interferences or issues stemming from communicating in an unlicensed spectrum (e.g., LBT issues). For example, the UE 115 may receive a trigger for ACK feedback in downlink channel monitoring occasions 710-*a* and/or 710-*b*, but may miss transmitting the ACK feedback in corresponding uplink messages 705-*a* (e.g., TTI n) and 705-*b*. The base station 105 may detect the issue in a TTI after the first missed ACK feedback (e.g., TTI n+1). Accordingly, the base station 105 may then request an ACK feedback (e.g., by triggering the UE 115) in a downlink channel monitoring occasion 710-*c* in a subsequent TTI (e.g., TTI n+2), where downlink channel monitoring occasion 710-*c* includes control information for the UE 115 to transmit ACK feedback for downlink messages that span a monitoring occasion duration 715-*e* in an uplink message 720. As such uplink message 720 may include the missed ACK feedback for the downlink messages associated with downlink channel monitoring occasion 710-*a* and uplink message 705-*a* (e.g., downlink messages in monitoring occasion duration 715-*b*). For example, monitoring occasion durations 715-*a*, 715-*b*, 715-*c*, and 715-*d* may span two (2) TTIs (e.g., slots) for corresponding downlink channel monitoring occasions, while monitoring occasion duration 715-*e* may span four (4) TTIs for downlink channel monitoring occasion 710-*c* to include downlink messages associated with the missed ACK feedback in uplink message 705-*a*.

However, the base station 105 may request ACK feedback for a subset of the TTIs in monitoring occasion duration 715-*e* and may receive ACK feedback for one of the slots while establishing the new monitoring occasion duration 715 in response to the missed ACK feedback transmission. Accordingly, the specific set of downlink channel monitoring occasions and corresponding downlink channels to transmit ACK feedback for may be derived through higher layer signaling (e.g., RRC configuration) and DCI. For example, a table configured by the higher layer signaling may indicate which downlink channel monitoring occasion(s) to transmit the ACK feedback based on the originally configured monitoring occasion duration 715 (e.g., TTI n if the original monitoring occasion duration 715 equaled one (1) TTI or TTIs n and n−1 or TTIs n and n−2 if the original monitoring occasion duration 715 equaled two (2) TTIs). DCI may then indicate one of the options if multiple options are present (e.g., by indicating the index or indices of the TTIs). In some cases, the UE 115 may determine a new HARQ ACK codebook size for the newly established monitoring occasion duration 715 or may use the same HARQ ACK codebook size based on the number of downlink channel monitoring occasions. Note that this determination may require an indication of the set of TTIs and/or number of TTIs to include in the HARQ feedback in the downlink DCI (e.g., downlink or uplink grant, ACK trigger, etc.). This requirement may enhance the semi-static codebook size computation mode of NR. Further, as codebook size is determined based on a number of TTIs indicated in the DCI, such an indication may allow for a dynamic codebook size.

As described herein, the ACK feedback sent on an uplink message (e.g., an uplink message 705) may include the ACK feedback for all slots within the codebook size determination window or may include ACK feedback for a particular ACK resource (e.g., via an ACK resource indicator in a DCI message). The HARQ ACK codebook size may still be based on all slots that are may be included within the codebook size determination window (which may include DCI that point to the ACK resources, other slots that may not have DCI detected, or slots that may have DCI pointed to another ACK resource). The ACK feedback for slots that point to the ACK resource may be set per PDSCH decoding status, while ACK feedback for rest of the slots may be set to a fixed value such as in NACK. Additionally or alternatively, the HARQ feedback process may allow the UE 115 to switch between the above two methods of HARQ ACK feedback based on for example, an explicit indication in the DCI or an implicit indication based on some other parameters in the DCI.

Figure 8:
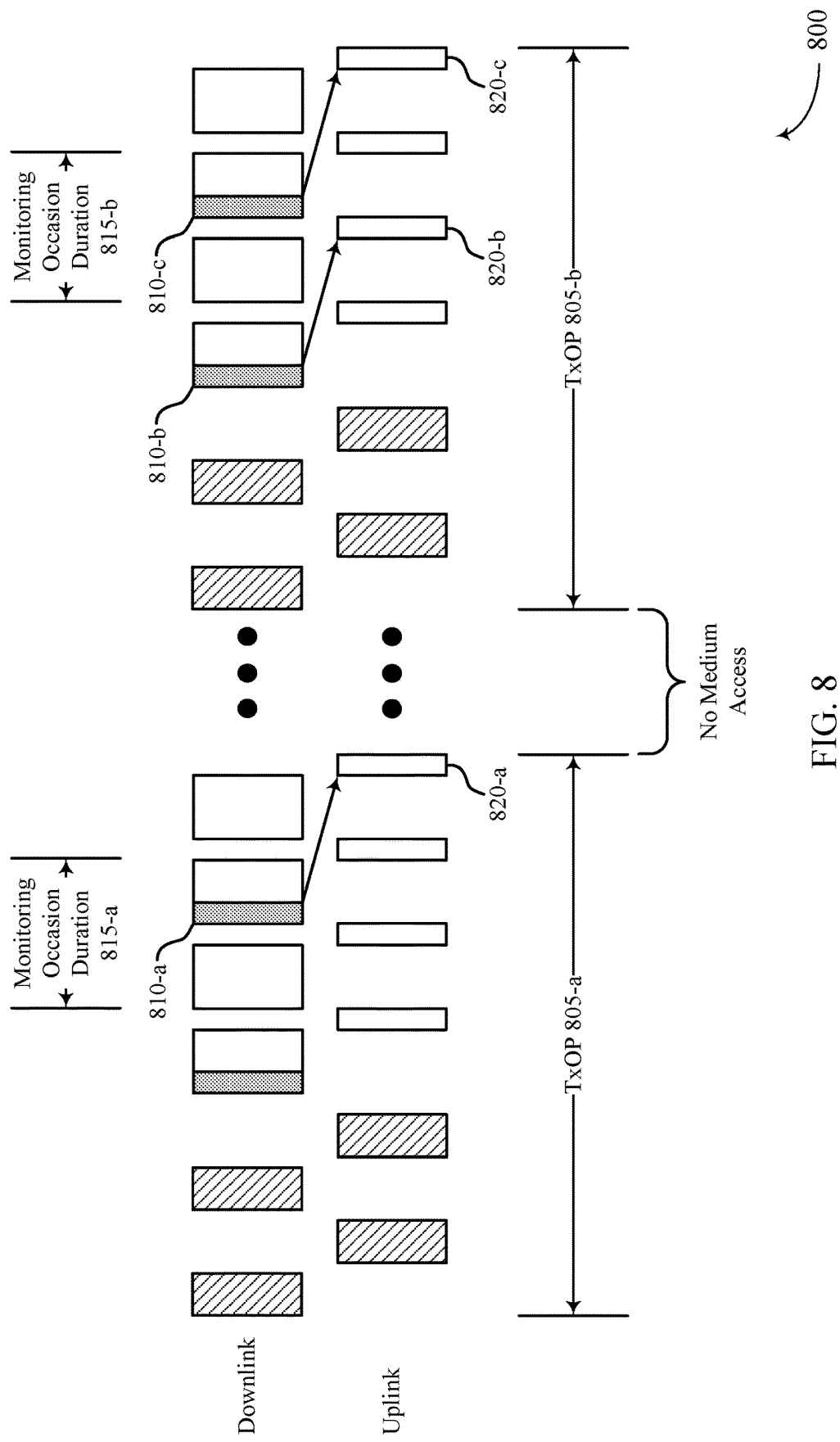
FIG. 8 illustrates an example of an ACK feedback scheme that supports ACK feedback in unlicensed NR in accordance with aspects of the present disclosure.

FIG. 8 illustrates an example of an ACK feedback scheme 800 that supports ACK feedback in unlicensed NR in accordance with various aspects of the present disclosure. In some examples, ACK feedback scheme 800 may implement aspects of wireless communications systems 100 and/or 300. ACK feedback scheme 800 may include downlink and uplink transmissions between a base station 105 and a UE 115 for HARQ ACK feedback, where the base station 105 and UE 115 are examples of corresponding devices as described with reference to FIGS. 1-7. As described herein, ACK feedback scheme 800 may further include ACK feedback transmitted according to a HARQ ACK codebook size based on, for example, both a number of downlink channel monitoring occasions and a number of configured HARQ processes for the UE 115. The downlink channel monitoring occasions may be either downlink data channel monitoring occasions or downlink control channel monitoring occasions.

Accordingly, the UE 115 may determine a HARQ ACK codebook size based on the number of downlink channel monitoring occasions that can satisfy self-contained ACK feedback within a same TxOp 805. Additionally, the base station 105 may trigger the UE 115 to transmit ACK feedback for the number of configured HARQ processes or a subset thereof. By additionally triggering the UE 115 to transmit ACK feedback based on the configured HARQ processes, downlink channel monitoring occasions not processed within the same TxOp 805 (and their ACK feedback) would spill over into a subsequent TxOp 805 would be covered. The trigger for transmitting the ACK feedback may be embedded in a downlink grant, uplink grant, or in a separate trigger DCI. Additionally, the trigger may indicate the type of ACK feedback. For example, the trigger may indicate that the UE 115 reports ACK feedback according to the most recent downlink channel monitoring occasions (e.g., type 1 trigger). Alternatively, the trigger may indicate that the UE reports the ACK feedback for the triggered one or more indicated HARQ processes (e.g., type 2 trigger).

In the example of ACK feedback scheme 800, the UE 115 may transmit ACK feedback in one or more uplink messages 820 that correspond to downlink channel monitoring occasions 810 in TxOps 805. Downlink channel monitoring occasion 810-a may indicate a monitoring occasion duration 815-a for downlink messages (e.g., two (2) slots) for which the UE 115 may transmit ACK feedback in uplink message 820-a. Alternatively, downlink channel monitoring occasion 810-b may indicate for the UE 115 to transmit ACK feedback for the configured HARQ processes (or subset thereof) in uplink message 820-b. Additionally, similar to downlink channel monitoring occasion 810-a, downlink channel monitoring occasion 810-c may indicate a monitoring occasion duration 815-b for downlink messages (e.g., two (2) slots) for which the UE 115 may transmit ACK feedback in uplink message 820-c.

Additionally or alternatively, as described herein, communications between the base station 105 and the UE 115 may include multiple channels (e.g., on one or more subbands), and the HARQ ACK codebook size may be further based on the number of channels or a number of indicated channels (e.g., active channels, subset of active channels, or checked out channels). The base station 105 may transmit the indicated channels embedded in a downlink grant, uplink grant, included in a trigger downlink control information, included in a common PDCCH, included in an L1 channel, or included in a preamble, where the UE 115 transmits the ACK feedback for the indicated channels.

Figure 9:
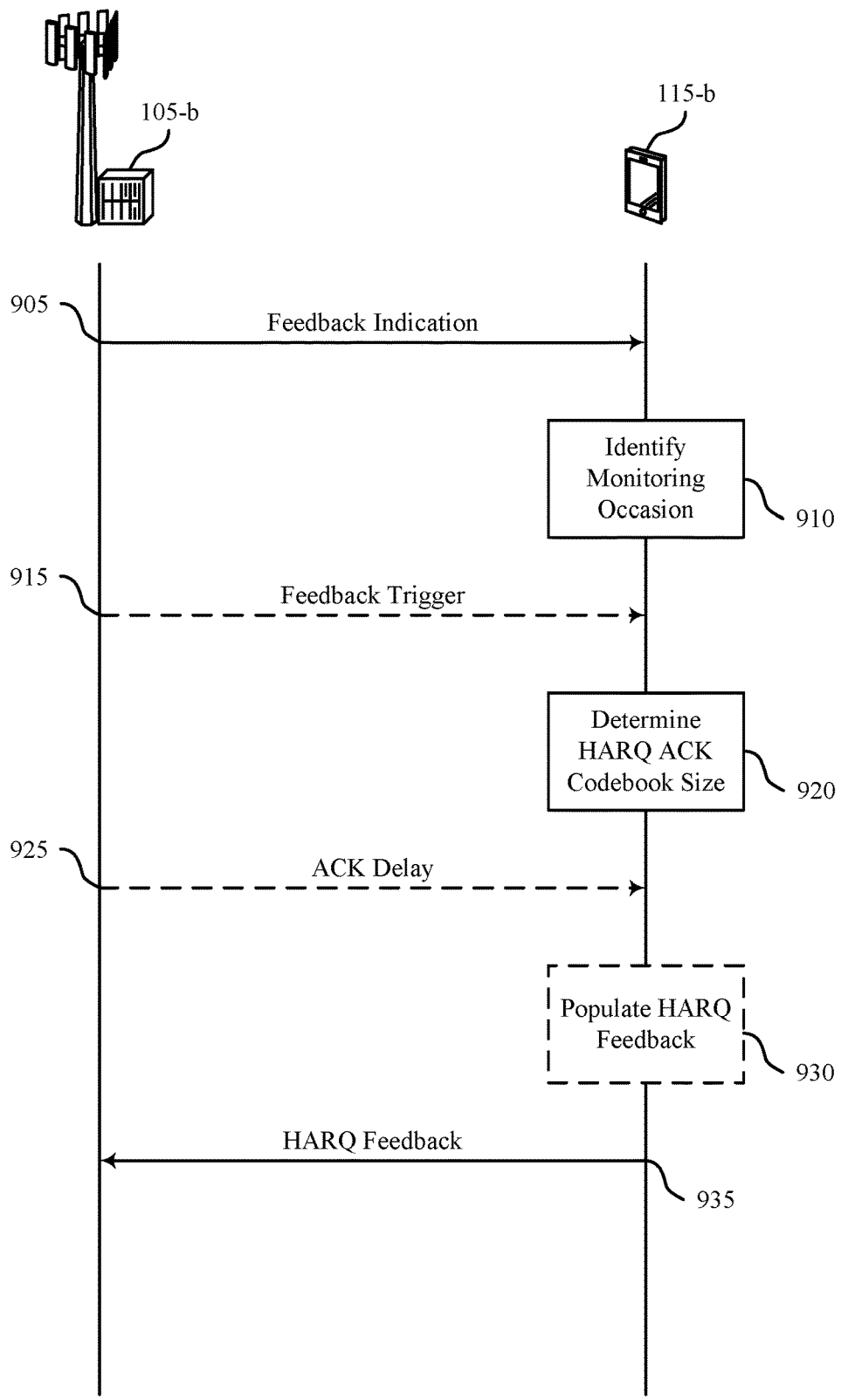
FIG. 9 illustrates an example of a process flow that supports ACK feedback in unlicensed NR in accordance with aspects of the present disclosure.

FIG. 9 illustrates an example of a process flow 900 that supports ACK feedback in unlicensed NR in accordance with various aspects of the present disclosure. In some examples, process flow 900 may implement aspects of communications systems 100 and/or 300. Process flow 900 may include a base station 105-b and a UE 115-b, which may be examples of corresponding devices as described with reference to FIGS. 1-8. As described herein, base station 105-b and UE 115-b may communicate in an unlicensed spectrum (e.g., shared radio frequency spectrum band).

In the following description of the process flow 900, the operations between UE 115-b and base station 105-b may be performed in different orders or at different times. Certain operations may also be left out of the process flow 900, or other operations may be added to the process flow 900. It is to be understood that while UE 115-b and base station 105-b are shown performing a number of the operations of process flow 900, any wireless device may perform the operations shown.

At 905, base station 105-b may transmit a feedback indication to UE 115-b, where the feedback indication indicates to UE 115-b whether it is to determine a HARQ ACK codebook size based on a duration of a downlink channel monitoring occasion or a number of configured HARQ processes. In some cases, base station 105-b may transmit the feedback indication embedded in a downlink grant or in a separate trigger DCI.

At 910, UE 115-b may identify a duration of a downlink channel monitoring occasion for which HARQ feedback is to be reported. In some cases, UE 115-b may receive, during a TxOp in which a downlink channel monitoring occasion is to occur but before the downlink channel monitoring occasion occurs, information from which UE 115-b is able to determine the duration of the downlink channel monitoring occasion. Additionally or alternatively, UE 115-b may identify at least one downlink channel monitoring occasion.

At 915, UE 115-b may receive a feedback trigger for transmission of HARQ feedback. In some cases, UE 115-b may receive the feedback trigger via DCI or embedded in a downlink grant. Additionally or alternatively, UE 115-b may receive a trigger for HARQ feedback for a set of configured HARQ processes for UE 115-b. Accordingly, UE 115-b may receive a plurality of predefined sets of configured HARQ processes via RRC signaling. In some cases, the feedback trigger may further indicate whether a HARQ ACK codebook size determination may be based on the duration of the at least one downlink channel monitoring occasion or on the number of configured HARQ processes.

At 920, UE 115-b may determine a HARQ ACK codebook size based on the duration of the downlink channel monitoring occasion. Additionally or alternatively, UE 115-b may determine the HARQ ACK codebook size based on a number of configured HARQ processes. In some cases, UE 115-b may determine the HARQ ACK codebook size based on receiving, in DCI, an indication of a number of downlink channel monitoring occasions to include in determining the HARQ ACK codebook size. Additionally or alternatively, UE 115-b may determine the HARQ ACK codebook size based on receiving, in DCI, an indication of a set of downlink channel monitoring occasions to include in determining the HARQ ACK codebook size, where the set is one of a plurality of predefined sets of downlink channel monitoring occasions. Accordingly, UE 115-b may receive the plurality of predefined sets of downlink channel monitoring occasions via RRC signaling.

In some cases, UE 115-b may determine the HARQ ACK codebook size based on the duration of the downlink channel monitoring occasion for a first set of HARQ feedback instances of the HARQ feedback and on a number of configured HARQ processes for a second set of HARQ feedback instances of the HARQ feedback. In some cases, the first set of HARQ feedback instances may be transmitted during a same TxOp, and the second set of HARQ feedback instances may be transmitted in a different TxOp. Additionally or alternatively, UE 115-b may determine the HARQ ACK codebook size based on a total number of channels associated with the UE. In some cases, UE 115-b may receive a channel indication of a number of channels to be included in determining the HARQ ACK codebook size (e.g., a number of checked out channels) and may determine the HARQ ACK codebook size based on the number of channels indicated by the channel indication. Accordingly, UE 115-b may receive the channel indication embedded in a downlink grant, included in a trigger DCI, included in an L1 channel, or included in a preamble. In some cases, the HARQ ACK codebook size may encompass a number of TTIs. The number of TTIs encompassed by the HARQ ACK codebook size may span two different TxOps. Additionally or alternatively, at least some of the number of TTIs may be non-contiguous.

At 925, UE 115-b may receive, in association with a downlink grant, an ACK delay indication, where the ACK delay indication indicates a minimum time by which HARQ feedback is to be delayed. In some cases, the ACK delay may include N slots where N is based on a UE capability indication for UE 115-b. For example, when N=1, a downlink message (e.g., a PDSCH message) is sent on slot n and UE 115-b may generate ACK feedback in slot n+1.

At 930, UE 115-b may populate the HARQ feedback based on the ACK delay indication and receipt of a downlink channel. In some cases, UE 115-b may populate the HARQ feedback using decoding results when an ACK ready time for the downlink channel is less than the ACK delay indication. Additionally or alternatively, UE 115-b may populate the HARQ feedback using default values when an ACK ready time for the downlink channel is greater than the ACK delay indication. Accordingly, UE 115-b may populate the HARQ feedback using an ACK value, a negative ACK (HACK) value, or a previous ACK/NACK value.

At 935, UE 115-*b* may transmit, to base station 105-*b*, the HARQ feedback in accordance with the HARQ ACK codebook size.

Figure 10:
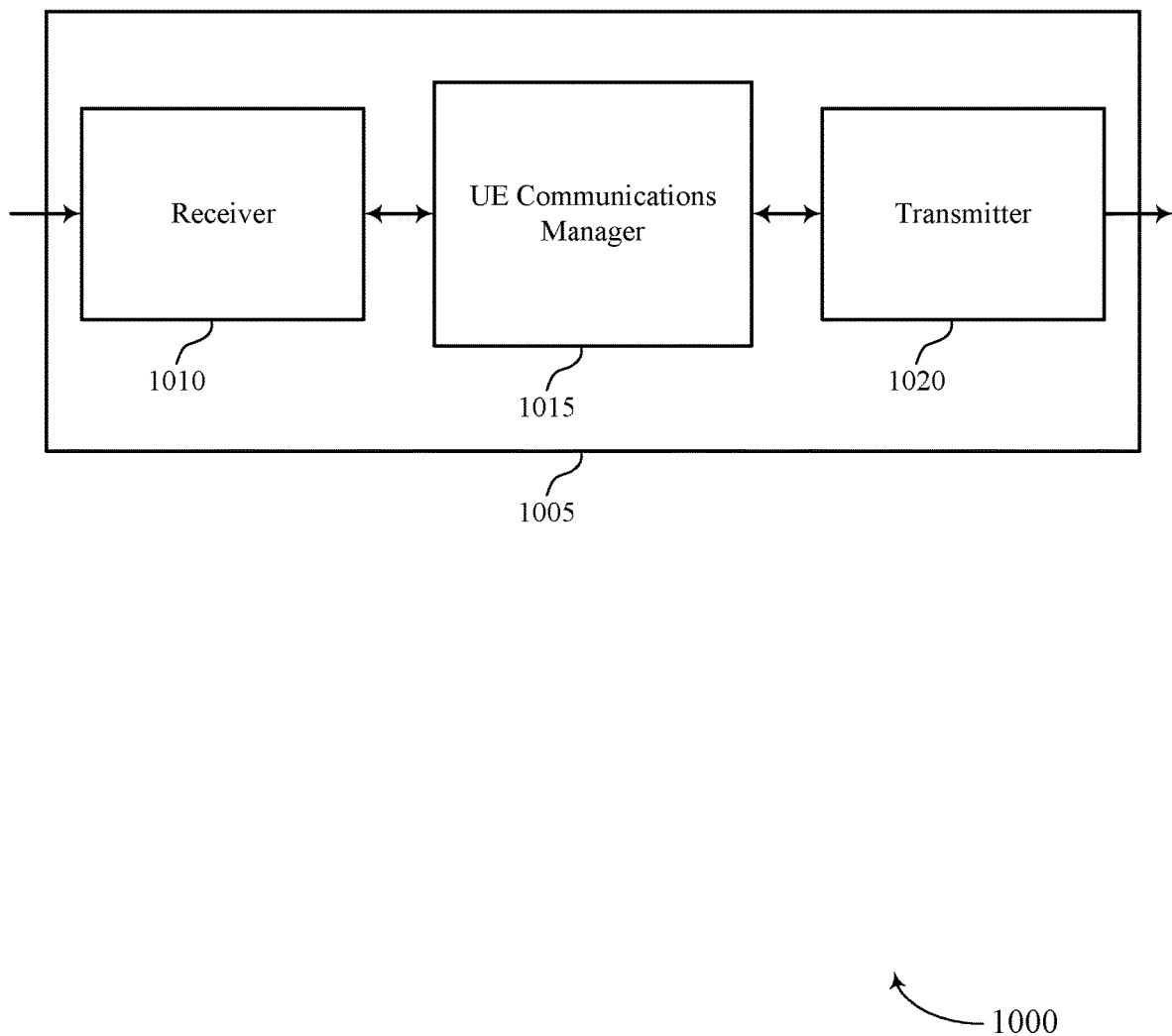
FIGS. 10 through 12 show block diagrams of a device that supports ACK feedback in unlicensed NR in accordance with aspects of the present disclosure.

FIG. 10 shows a block diagram 1000 of a wireless device 1005 that supports acknowledgement (ACK) feedback in unlicensed NR in accordance with aspects of the present disclosure. Wireless device 1005 may be an example of aspects of a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, channels, and information related to ACK feedback in unlicensed NR, etc.). Information may be passed on to other components of the device. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13.

UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may identify a duration of a downlink channel monitoring occasion (either a downlink data channel monitoring occasion or a downlink control channel monitoring occasion) for which HARQ feedback is to be reported. The UE communications manager 1015 may then determine a HARQ ACK codebook size based on the duration of the downlink channel monitoring occasion and transmit the HARQ feedback in accordance with the HARQ ACK codebook size. Additionally or alternatively, the UE communications manager 1015 may identify at least one downlink channel monitoring occasion. Accordingly, the UE communications manager 1015 may receive a feedback trigger for transmission of HARQ feedback and determine a HARQ ACK codebook size based on a number of configured HARQ processes. The UE communications manager 1015 may then transmit the HARQ feedback in accordance with the HARQ ACK codebook size.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
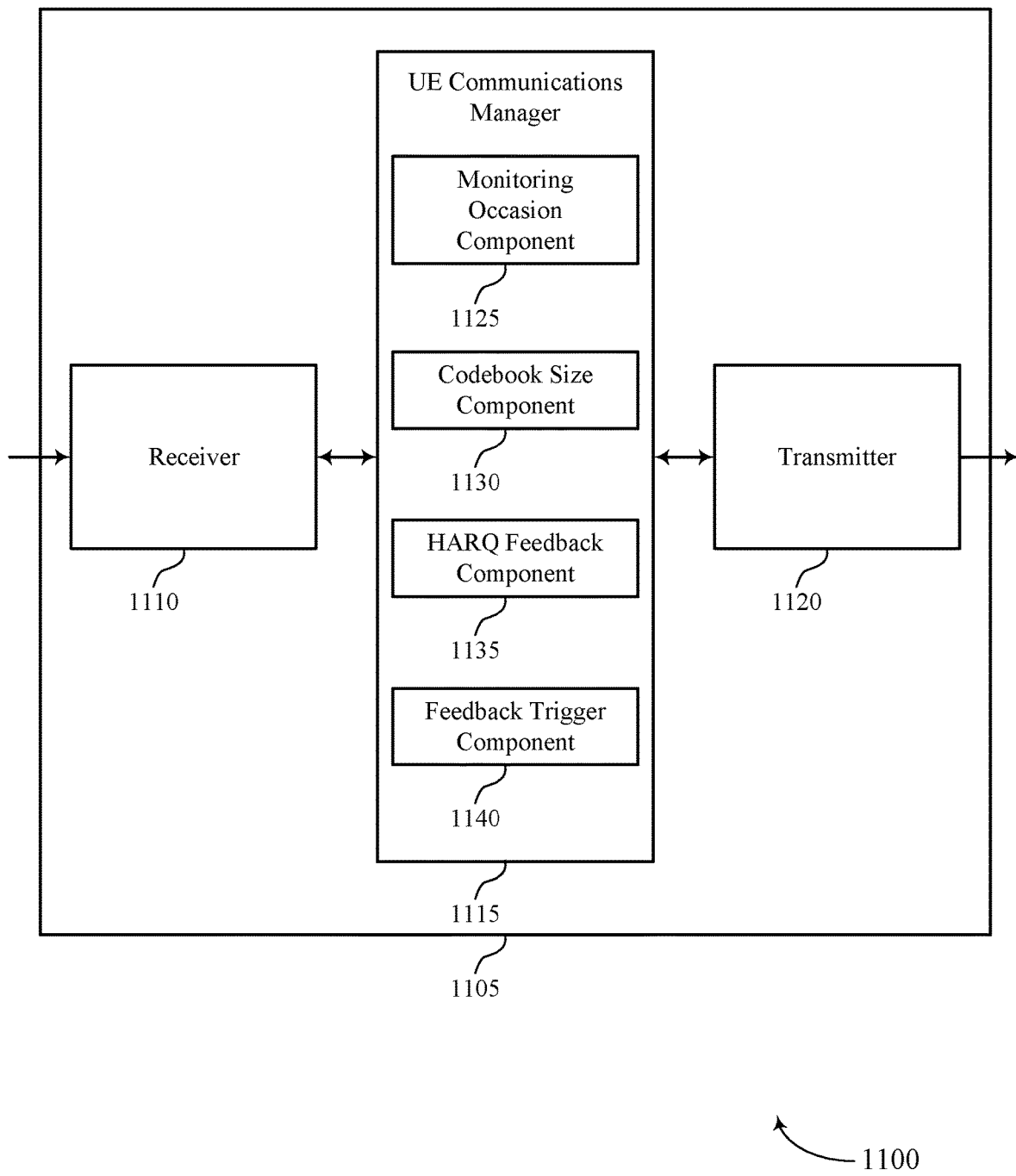

FIG. 11 shows a block diagram 1100 of a wireless device 1105 that supports ACK feedback in unlicensed NR in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, channels, and information related to ACK feedback in unlicensed NR, etc.). Information may be passed on to other components of the device. The receiver 1110 may be an example of aspects of the transceiver 1335 described with reference to FIG. 13. The receiver 1110 may utilize a single antenna or a set of antennas.

UE communications manager 1115 may be an example of aspects of the UE communications manager 1315 described with reference to FIG. 13.

UE communications manager 1115 may also include monitoring occasion component 1125, codebook size component 1130, HARQ feedback component 1135, and feedback trigger component 1140.

Monitoring occasion component 1125 may identify a duration of a downlink channel monitoring occasion for which HARQ feedback is to be reported. In some cases, monitoring occasion component 1125 may receive, during a TxOp in which a downlink channel monitoring occasion is to occur but before the downlink channel monitoring occasion occurs, information from which the UE is able to determine the duration of the downlink channel monitoring occasion. Additionally or alternatively, monitoring occasion component 1125 may identify at least one downlink channel monitoring occasion. The downlink channel monitoring occasion may be either a downlink data channel monitoring occasion or a downlink control channel monitoring occasion.

Codebook size component 1130 may determine a HARQ ACK codebook size based on the duration of the downlink channel monitoring occasion. In some cases, the HARQ ACK codebook size encompasses a number of TTIs. In some cases, the number of TTIs encompassed by the HARQ ACK codebook size spans two different TxOps. Additionally or alternatively, in some cases, at least some of the number of TTIs are non-contiguous.

HARQ feedback component 1135 may transmit the HARQ feedback in accordance with the HARQ ACK codebook size.

Feedback trigger component 1140 may receive, at the UE, a feedback trigger for transmission of HARQ feedback. In some cases, codebook size component 1130 may then determine a HARQ ACK codebook size based on a number of configured HARQ processes for the triggered HARQ feedback. Additionally, receiving the feedback trigger may include receiving the feedback trigger via downlink control information or embedded in a downlink grant. Alternatively, in some cases, receiving the feedback trigger may include receiving a trigger for HARQ feedback for a set of configured HARQ processes for the UE. Accordingly, feedback trigger component 1140 may receive a set of predefined sets of configured HARQ processes via RRC signaling.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
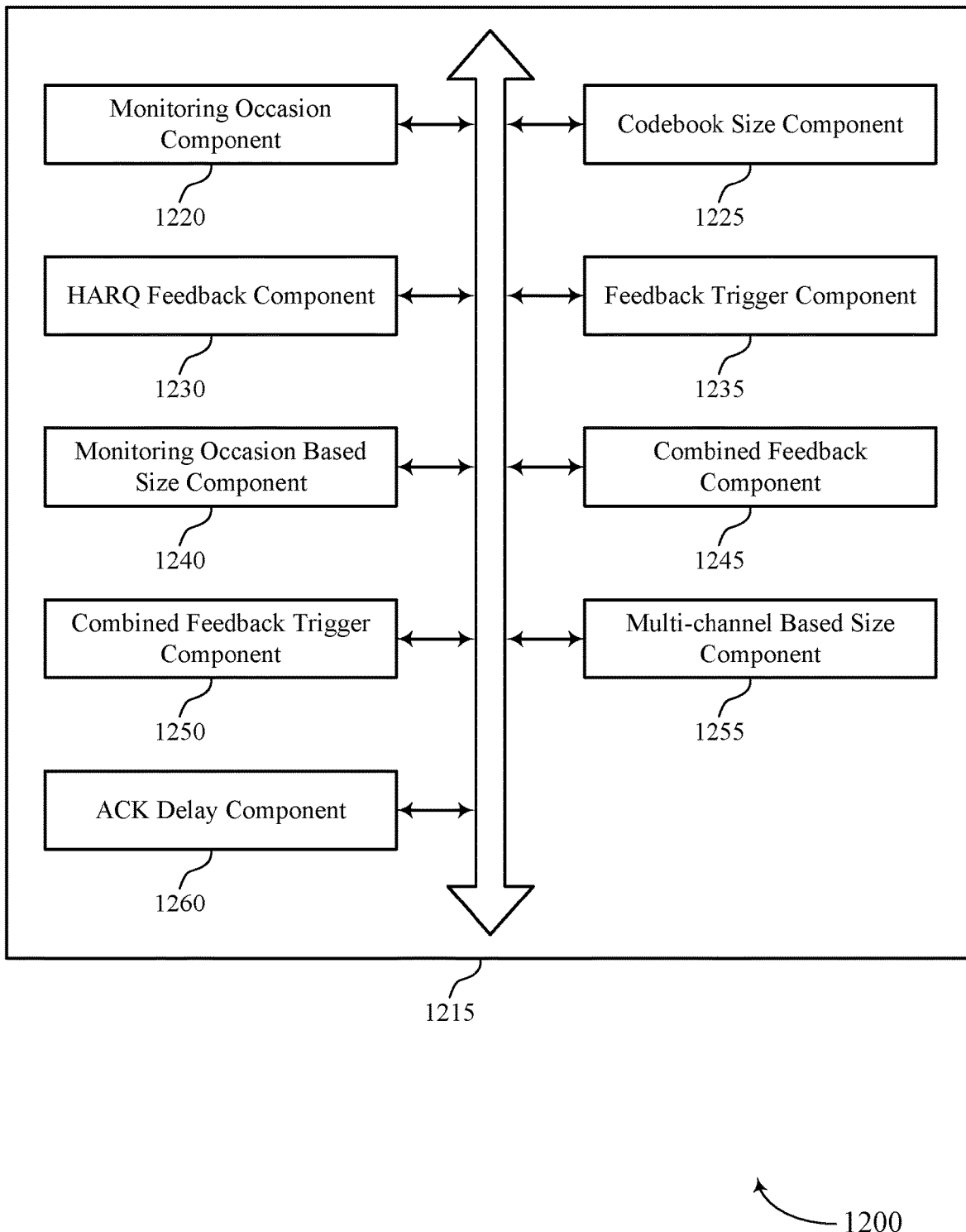

FIG. 12 shows a block diagram 1200 of a UE communications manager 1215 that supports ACK feedback in unlicensed NR in accordance with aspects of the present disclosure. The UE communications manager 1215 may be an example of aspects of a UE communications manager 1015, a UE communications manager 1115, or a UE communications manager 1315 described with reference to FIGS. 10, 11, and 13. The UE communications manager 1215 may include monitoring occasion component 1220, codebook size component 1225, HARQ feedback component 1230, feedback trigger component 1235, monitoring occasion based size component 1240, combined feedback component 1245, combined feedback trigger component 1250, multi-channel based size component 1255, and ACK delay component 1260. Each of these modules may communicate, directly or indirectly, with one another (e.g., via one or more buses).

Monitoring occasion component 1220 may identify a duration of a downlink channel monitoring occasion to report HARQ feedback. In some cases, monitoring occasion component 1220 may receive, during a TxOp in which a downlink channel monitoring occasion is to occur but before the downlink channel monitoring occasion occurs, information from which the UE is able to determine the duration of the downlink channel monitoring occasion. Additionally or alternatively, monitoring occasion component 1220 may identify at least one downlink channel monitoring occasion. The downlink channel monitoring occasion may be either a downlink data channel monitoring occasion or a downlink control channel monitoring occasion.

Codebook size component 1225 may determine a HARQ ACK codebook size based on the duration of the downlink channel monitoring occasion. In some cases, the HARQ ACK codebook size encompasses a number of TTIs. In some cases, the number of TTIs encompassed by the HARQ ACK codebook size spans two different TxOps. Additionally or alternatively, in some cases, at least some of the number of TTIs are non-contiguous.

HARQ feedback component 1230 may transmit the HARQ feedback in accordance with the HARQ ACK codebook size.

Feedback trigger component 1235 may receive, at the UE, a feedback trigger for transmission of HARQ feedback. In some cases, codebook size component 1225 may then determine a HARQ ACK codebook size based on a number of configured HARQ processes for the triggered HARQ feedback. Additionally, receiving the feedback trigger may include receiving the feedback trigger via downlink control information or embedded in a downlink grant. Alternatively, in some cases, receiving the feedback trigger may include receiving a trigger for HARQ feedback for a set of configured HARQ processes for the UE. Accordingly, feedback trigger component 1235 may receive a set of predefined sets of configured HARQ processes via RRC signaling.

Monitoring occasion based size component 1240 may receive, in downlink control information, an indication of a number of downlink channel monitoring occasions to include in determining the HARQ ACK codebook size. Additionally or alternatively, monitoring occasion based size component 1240 may receive, in downlink control information, an indication of a set of downlink channel monitoring occasions to include in determining the HARQ ACK codebook size, where the set is one of a set of predefined sets of downlink channel monitoring occasions. In some cases, monitoring occasion based size component 1240 may receive the set of predefined sets of downlink channel monitoring occasions via RRC signaling.

Combined feedback component 1245 may determine the HARQ ACK codebook size based on the duration of the downlink channel monitoring occasion for a first set of HARQ feedback instances of the HARQ feedback and based on a number of configured HARQ processes for a second set of HARQ feedback instances of the HARQ feedback. In some cases, the first set of HARQ feedback instances may be transmitted during a same TxOp, and the second set of HARQ feedback instances may be transmitted in a different TxOp.

Combined feedback trigger component 1250 may receive a feedback trigger indicating whether the HARQ ACK codebook size determination is to be based on the duration of the at least one downlink channel monitoring occasion or on the number of configured HARQ processes. In some cases, receiving the feedback trigger may include receiving the feedback trigger embedded in a downlink grant or in a separate trigger DCI.

Multi-channel based size component 1255 may determine the HARQ ACK codebook size based on the number of channels indicated by the channel indication. In some cases, multi-channel based size component 1255 may further determine the HARQ ACK codebook size based on a total number of channels associated with the UE. Additionally or alternatively, multi-channel based size component 1255 may receive a channel indication of a number of channels to include for determining the HARQ ACK codebook size. In some cases, receiving the channel indication may include receiving the channel indication embedded in a downlink grant, included in a trigger downlink control information, included in an L1 channel, or included in a preamble.

ACK delay component 1260 may receive, in association with a downlink grant, an ACK delay indication, where the ACK delay indication indicates a minimum time by which HARQ feedback is to be delayed. Accordingly, ACK delay component 1260 may populate the HARQ feedback based on the ACK delay indication and receipt of a downlink channel. In some cases, populating the HARQ feedback may include populating the HARQ feedback using decoding results when an ACK ready time for the downlink channel is less than the ACK delay indication. Additionally or alternatively, populating the HARQ feedback may include populating the HARQ feedback using default values when an ACK ready time for the downlink channel is greater than the ACK delay indication. Accordingly, populating the HARQ feedback with default values may include populating the HARQ feedback using an ACK value, a NACK value, or a previous ACK/NACK value.

Figure 13:
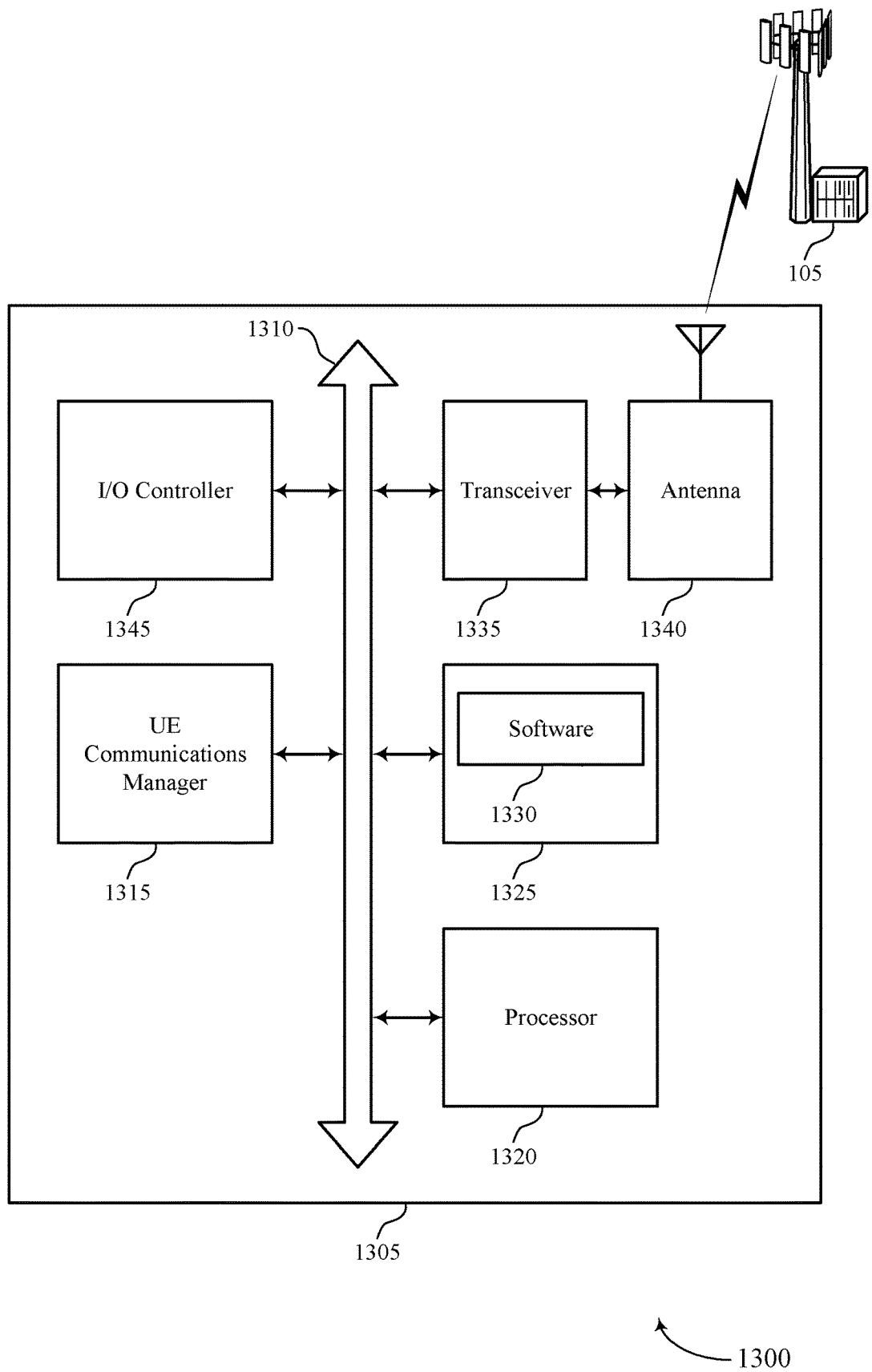
FIG. 13 illustrates a block diagram of a system including a user equipment (UE) that supports ACK feedback in unlicensed NR in accordance with aspects of the present disclosure.

FIG. 13 shows a diagram of a system 1300 including a device 1305 that supports ACK feedback in unlicensed NR in accordance with aspects of the present disclosure. Device 1305 may be an example of or include the components of wireless device 1005, wireless device 1105, or a UE 115 as described herein, e.g., with reference to FIGS. 10 and 11. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting ACK feedback in unlicensed NR).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support ACK feedback in unlicensed NR. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
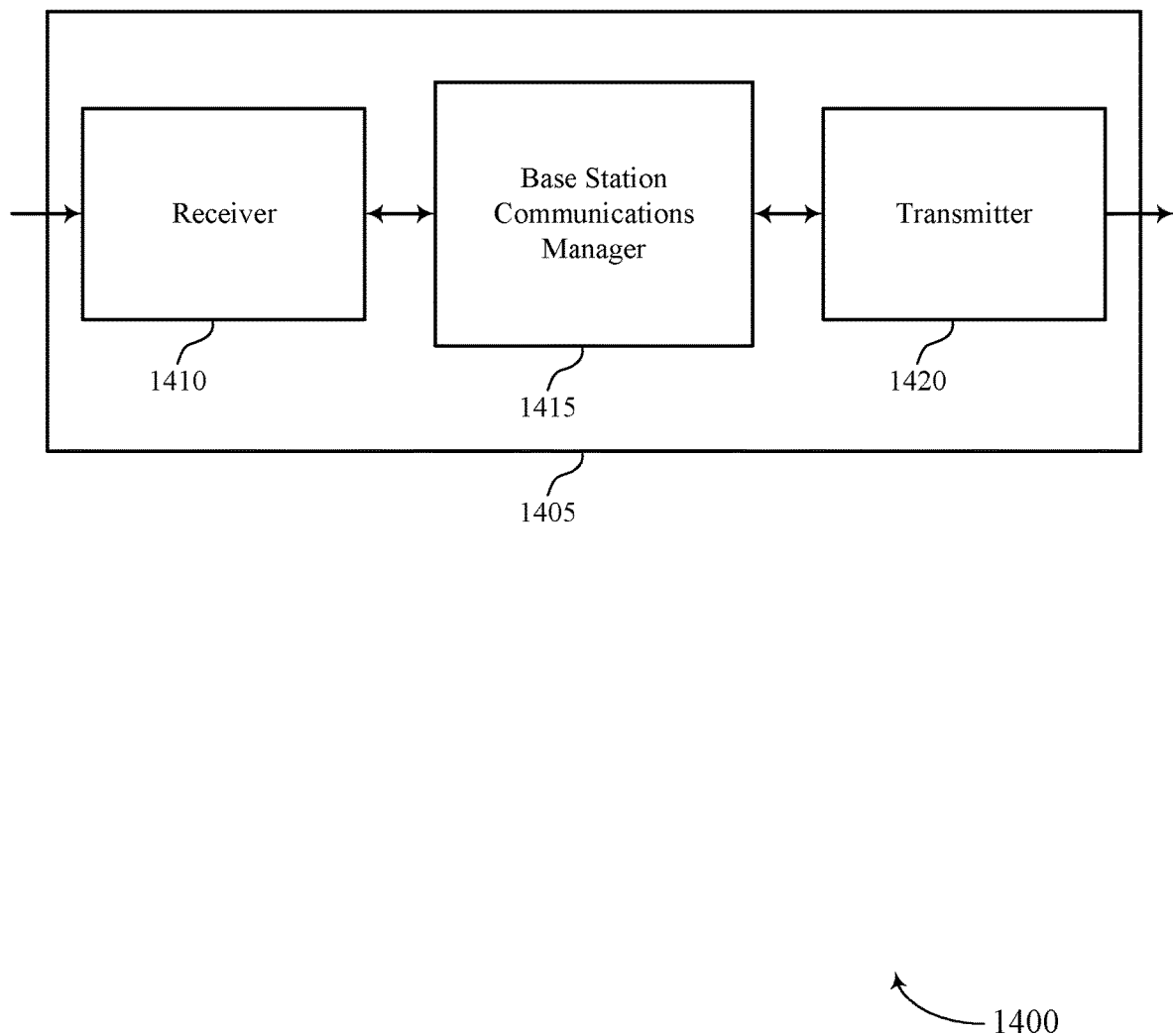
FIGS. 14 through 16 show block diagrams of a device that supports ACK feedback in unlicensed NR in accordance with aspects of the present disclosure.

FIG. 14 shows a block diagram 1400 of a wireless device 1405 that supports ACK feedback in unlicensed NR in accordance with aspects of the present disclosure. Wireless device 1405 may be an example of aspects of a base station 105 as described herein. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, channels, and information related to ACK feedback in unlicensed NR, etc.). Information may be passed on to other components of the device. The receiver 1410 may be an example of aspects of the transceiver 1735 described with reference to FIG. 17. The receiver 1410 may utilize a single antenna or a set of antennas.

Base station communications manager 1415 may be an example of aspects of the base station communications manager 1715 described with reference to FIG. 17.

Base station communications manager 1415 and/or at least some of its various sub-components may be implemented in hardware, software executed by a processor, firmware, or any combination thereof. If implemented in software executed by a processor, the functions of the base station communications manager 1415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1415 and/or at least some of its various sub-components may be physically located at various positions, including being distributed such that portions of functions are implemented at different physical locations by one or more physical devices. In some examples, base station communications manager 1415 and/or at least some of its various sub-components may be a separate and distinct component in accordance with various aspects of the present disclosure. In other examples, base station communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1415 may transmit a feedback indication to a UE, where the feedback indication indicates to the UE whether the UE is to determine a HARQ ACK codebook size based on a duration of a downlink channel monitoring occasion or a number of configured HARQ processes. Accordingly, base station communications manager 1415 may receive HARQ feedback in accordance with the HARQ ACK codebook size and the feedback indication.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
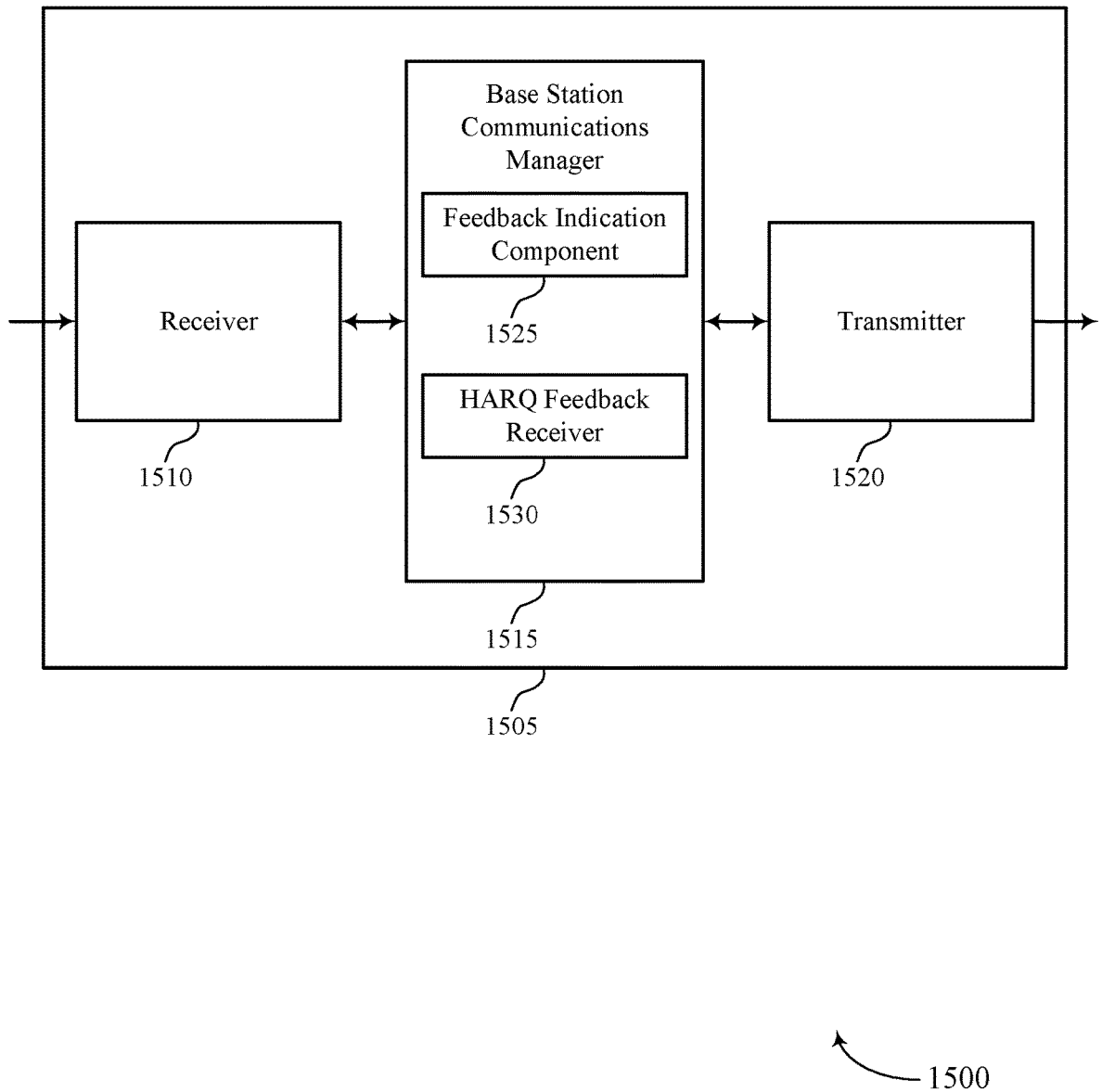

FIG. 15 shows a block diagram 1500 of a wireless device 1505 that supports ACK feedback in unlicensed NR in accordance with aspects of the present disclosure. Wireless device 1505 may be an example of aspects of a wireless device 1405 or a base station 105 as described with reference to FIG. 14. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, channels, and information related to ACK feedback in unlicensed NR, etc.). Information may be passed on to other components of the device. The receiver 1510 may be an example of aspects of the transceiver 1735 described with reference to FIG. 17. The receiver 1510 may utilize a single antenna or a set of antennas.

Base station communications manager 1515 may be an example of aspects of the base station communications manager 1715 described with reference to FIG. 17.

Base station communications manager 1515 may also include feedback indication component 1525 and HARQ feedback receiver 1530.

Feedback indication component 1525 may transmit a feedback indication to a UE, where the feedback indication indicates to the UE whether the UE is to determine a HARQ ACK codebook size based on a duration of a downlink channel monitoring occasion or a number of configured HARQ processes. In some cases, feedback indication component 1525 may transmit the feedback indication embedded in a downlink grant or in a separate trigger downlink control information.

HARQ feedback receiver 1530 may receive HARQ feedback in accordance with the HARQ ACK codebook size and the feedback indication.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
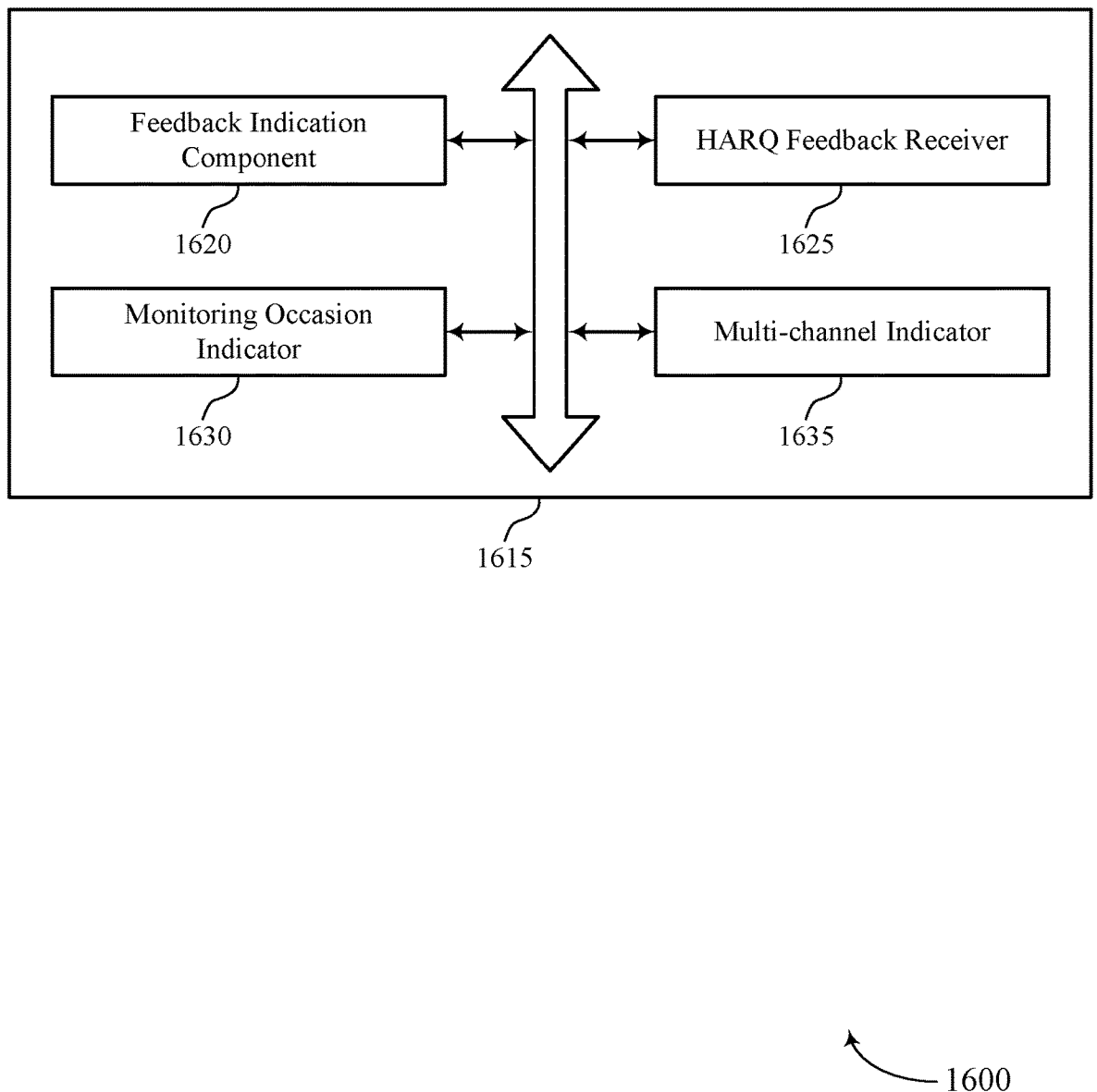

FIG. 16 shows a block diagram 1600 of a base station communications manager 1615 that supports ACK feedback in unlicensed NR in accordance with aspects of the present disclosure. The base station communications manager 1615 may be an example of aspects of a base station communications manager 1715 described with reference to FIGS. 14, 15, and 17. The base station communications manager 1615 may include feedback indication component 1620, HARQ feedback receiver 1625, monitoring occasion indicator 1630, and multi-channel indicator 1635. Each of these modules may communicate, directly or indirectly, with one another (e.g., via one or more buses).

Feedback indication component 1620 may transmit a feedback indication to a UE, where the feedback indication indicates to the UE whether the UE is to determine a HARQ ACK codebook size based on a duration of a downlink channel monitoring occasion or a number of configured HARQ processes. In some cases, feedback indication component 1620 may transmit the feedback indication embedded in a downlink grant or in a separate trigger downlink control information.

HARQ feedback receiver 1625 may receive HARQ feedback in accordance with the HARQ ACK codebook size and the feedback indication.

Monitoring occasion indicator 1630 may transmit, in downlink control information, an indication of a number of downlink channel monitoring occasions to include in determining the HARQ ACK codebook size. Additionally or alternatively, monitoring occasion indicator 1630 may transmit, in downlink control information, an indication of a set of downlink channel monitoring occasions to include in determining the HARQ ACK codebook size, where the set is one of a set of predefined sets of downlink channel monitoring occasions. In some cases, monitoring occasion indicator 1630 may transmit the set of predefined sets of downlink channel monitoring occasions via RRC signaling.

Multi-channel indicator 1635 may transmit a channel indication of a number of channels to be included in determining the HARQ ACK codebook size (e.g., a number of checked out channels). In some cases, transmitting the channel indication may include transmitting the channel indication embedded in a downlink grant, included in a trigger downlink control information, included in an L1 channel, or included in a preamble.

Figure 17:
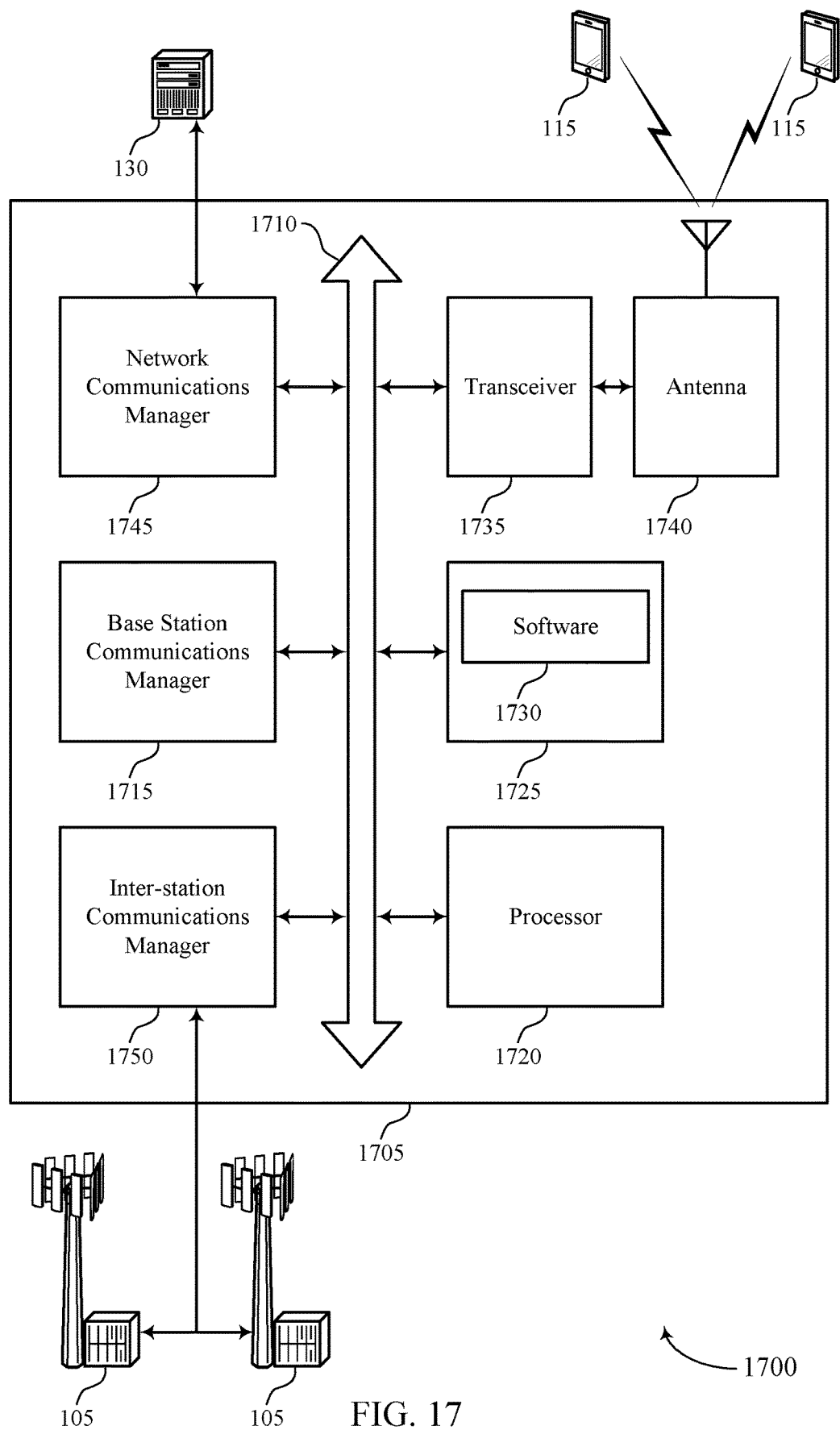
FIG. 17 illustrates a block diagram of a system including a base station that supports ACK feedback in unlicensed NR in accordance with aspects of the present disclosure.

FIG. 17 shows a diagram of a system 1700 including a device 1705 that supports ACK feedback in unlicensed NR in accordance with aspects of the present disclosure. Device 1705 may be an example of or include the components of base station 105 as described herein, e.g., with reference to FIG. 1. Device 1705 may include components for bi-directional voice and data communications including components for transmitting and receiving communications, including base station communications manager 1715, processor 1720, memory 1725, software 1730, transceiver 1735, antenna 1740, network communications manager 1745, and inter-station communications manager 1750. These components may be in electronic communication via one or more buses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting ACK feedback in unlicensed NR).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support ACK feedback in unlicensed NR. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described herein. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

Network communications manager 1745 may manage communications with the core network (e.g., via one or more wired backhaul links). For example, the network communications manager 1745 may manage the transfer of data communications for client devices, such as one or more UEs 115.

Inter-station communications manager 1750 may manage communications with other base station 105, and may include a controller or scheduler for controlling communications with UEs 115 in cooperation with other base stations 105. For example, the inter-station communications manager 1750 may coordinate scheduling for transmissions to UEs 115 for various interference mitigation techniques such as beamforming or joint transmission. In some examples, inter-station communications manager 1750 may provide an X2 interface within an Long Term Evolution (LTE)/LTE-A wireless communication network technology to provide communication between base stations 105.

Figure 18:
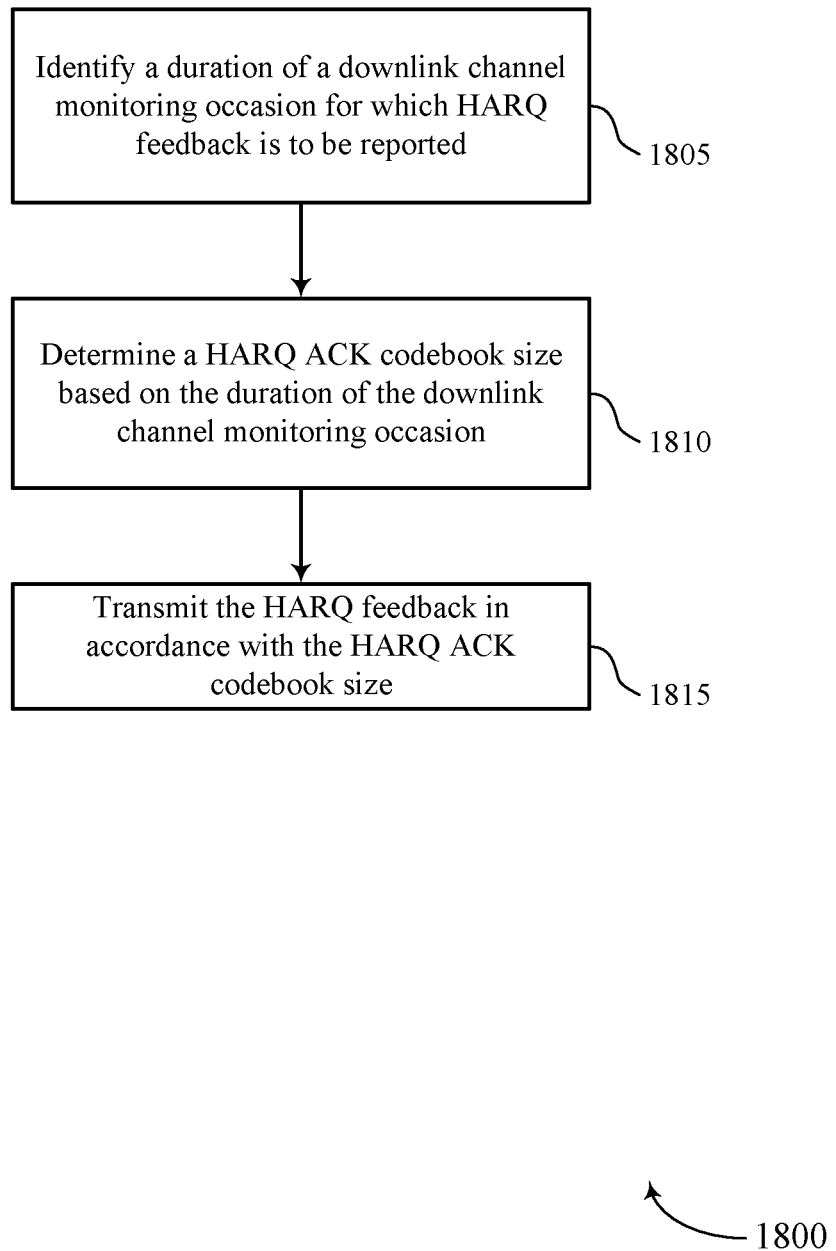
FIGS. 18 through 20 illustrate methods for ACK feedback in unlicensed NR in accordance with aspects of the present disclosure.

FIG. 18 shows a flowchart illustrating a method 1800 for ACK feedback in unlicensed NR in accordance with aspects of the present disclosure. The operations of method 1800 may be implemented by a UE 115 or its components as described herein. For example, the operations of method 1800 may be performed by a UE communications manager as described with reference to FIGS. 10 through 13. In some examples, a UE 115 may execute a set of codes to control the functional elements of the device to perform the functions described herein. Additionally or alternatively, the UE 115 may perform aspects of the functions described herein using special-purpose hardware.

At 1805 the UE 115 may identify a duration of a downlink channel monitoring occasion for which HARQ feedback is to be reported. The operations of 1805 may be performed according to the methods described herein. In certain examples, aspects of the operations of 1805 may be performed by a monitoring occasion component as described with reference to FIGS. 10 through 13.

At 1810 the UE 115 may determine a HARQ ACK codebook size based on the duration of the downlink channel monitoring occasion. The operations of 1810 may be performed according to the methods described herein. In certain examples, aspects of the operations of 1810 may be performed by a codebook size component as described with reference to FIGS. 10 through 13.

At 1815 the UE 115 may transmit the HARQ feedback in accordance with the HARQ ACK codebook size. The operations of 1815 may be performed according to the methods described herein. In certain examples, aspects of the operations of 1815 may be performed by a HARQ feedback component as described with reference to FIGS. 10 through 13.

Figure 19:
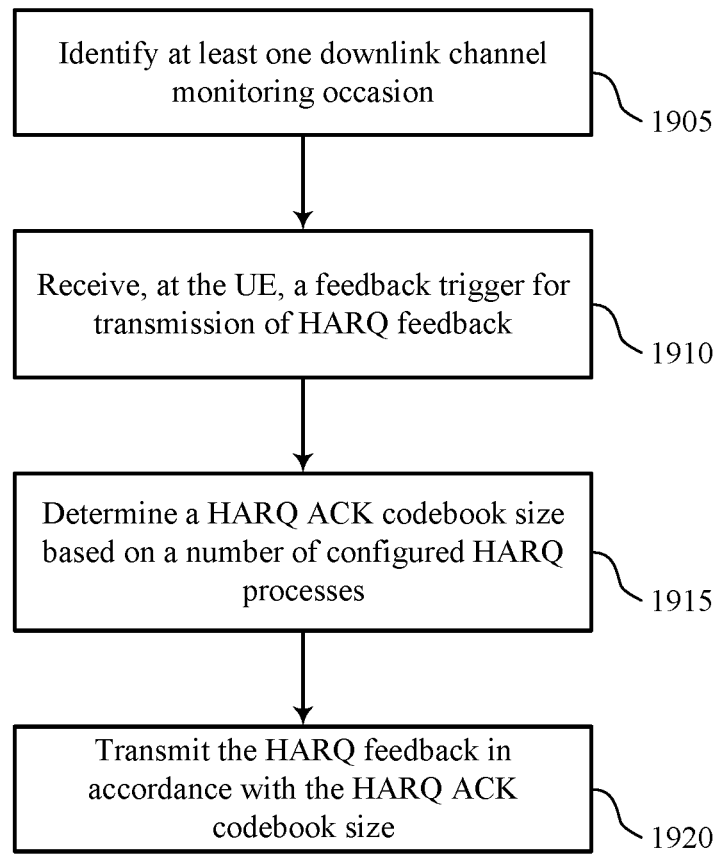

FIG. 19 shows a flowchart illustrating a method 1900 for ACK feedback in unlicensed NR in accordance with aspects of the present disclosure. The operations of method 1900 may be implemented by a UE 115 or its components as described herein. For example, the operations of method 1900 may be performed by a UE communications manager as described with reference to FIGS. 10 through 13. In some examples, a UE 115 may execute a set of codes to control the functional elements of the device to perform the functions described herein. Additionally or alternatively, the UE 115 may perform aspects of the functions described herein using special-purpose hardware.

At 1905 the UE 115 may identify at least one downlink channel monitoring occasion. The operations of 1905 may be performed according to the methods described herein. In certain examples, aspects of the operations of 1905 may be performed by a monitoring occasion component as described with reference to FIGS. 10 through 13.

At 1910 the UE 115 may receive a feedback trigger for transmission of HARQ feedback. The operations of 1910 may be performed according to the methods described herein. In certain examples, aspects of the operations of 1910 may be performed by a feedback trigger component as described with reference to FIGS. 10 through 13.

At 1915 the UE 115 may determine a HARQ ACK codebook size based on a number of configured HARQ processes. The operations of 1915 may be performed according to the methods described herein. In certain examples, aspects of the operations of 1915 may be performed by a codebook size component as described with reference to FIGS. 10 through 13.

At 1920 the UE 115 may transmit the HARQ feedback in accordance with the HARQ ACK codebook size. The operations of 1920 may be performed according to the methods described herein. In certain examples, aspects of the operations of 1920 may be performed by a HARQ feedback component as described with reference to FIGS. 10 through 13.

Figure 20:
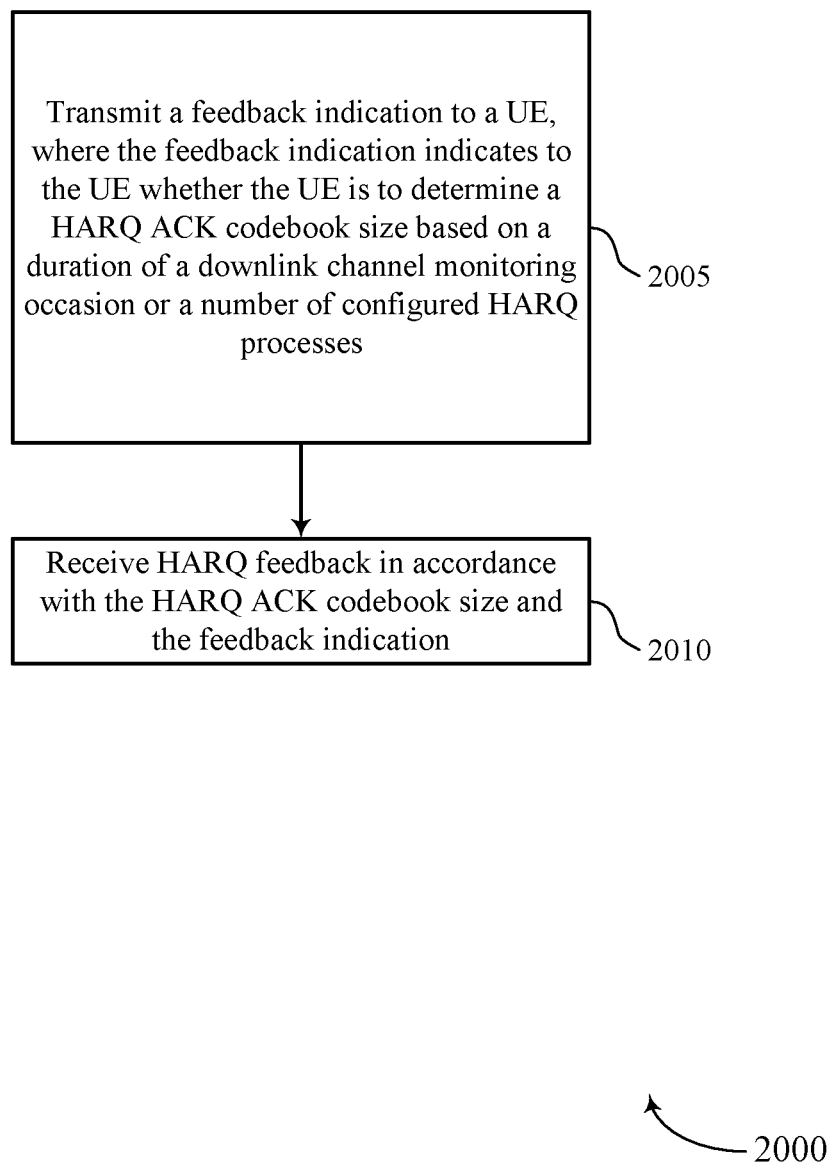

FIG. 20 shows a flowchart illustrating a method 2000 for ACK feedback in unlicensed NR in accordance with aspects of the present disclosure. The operations of method 2000 may be implemented by a base station 105 or its components as described herein. For example, the operations of method 2000 may be performed by a base station communications manager as described with reference to FIGS. 14 through 17. In some examples, a base station 105 may execute a set of codes to control the functional elements of the device to perform the functions described herein. Additionally or alternatively, the base station 105 may perform aspects of the functions described herein using special-purpose hardware.

At 2005 the base station 105 may transmit a feedback indication to a UE, where the feedback indication indicates to the UE whether the UE is to determine a HARQ ACK codebook size based on a duration of a downlink channel monitoring occasion or a number of configured HARQ processes. The operations of 2005 may be performed according to the methods described herein. In certain examples, aspects of the operations of 2005 may be performed by a feedback indication component as described with reference to FIGS. 14 through 17.

At 2010 the base station 105 may receive HARQ feedback in accordance with the HARQ ACK codebook size and the feedback indication. The operations of 2010 may be performed according to the methods described herein. In certain examples, aspects of the operations of 2010 may be performed by a HARQ feedback receiver as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE) in a shared radio frequency spectrum band, comprising:
   receiving, at the UE, a downlink grant scheduling a downlink channel to be received by the UE;
   identifying, in association with the downlink grant, an acknowledgement (ACK) delay indication, wherein the ACK delay indication indicates a minimum time by which hybrid access request (HARQ) feedback is to be delayed after receiving the downlink channel;
   receiving, at the UE, the downlink channel;
   determining whether to transmit HARQ feedback for the downlink channel based at least in part on a value of the ACK delay indication; and
   transmitting the HARQ feedback based at least in part on the determining.

2. The method of claim 1, wherein determining whether to transmit HARQ feedback for the downlink channel comprises:
   determining to not transmit the HARQ feedback for the downlink channel based at least in part on the ACK delay indication; and
   refraining from transmitting the HARQ feedback based at least in part on the determining to not transmit the HARQ feedback.

3. The method of claim 1, further comprising:
   receiving a downlink control information message comprising an indication of a HARQ trigger event for transmitting the HARQ feedback and a location for the HARQ feedback, wherein the HARQ trigger event is jointly coded with the ACK delay indication.

4. The method of claim 1, wherein the value of the ACK delay indication is indicative of an absence of a HARQ trigger event.

5. A method for wireless communication at a user equipment (UE) in a shared radio frequency spectrum band, comprising:
   receiving, in a downlink control information message, a channel indication for a number of channels to be included in determining a hybrid access request (HARQ) acknowledgement (ACK) codebook size; and
   determining the HARQ ACK codebook size based at least in part on the number of channels indicated by the channel indication; and
   transmitting HARQ feedback in accordance with the HARQ ACK codebook size.

6. The method of claim 5, wherein receiving the channel indication comprises:
   receiving the channel indication embedded in a downlink grant, included in a trigger downlink control information, included in a layer 1 (L1) channel, or included in a preamble; and
   transmitting the HARQ feedback based at least in part on the downlink grant, the trigger downlink control information, the L1 channel, or the preamble in which the channel indication is embedded.

7. The method of claim 5, wherein the HARQ feedback comprises a number of HARQ ACK bits based at least in part on HARQ processes for the number of channels indicated by the channel indication.

8. A method for wireless communication at a user equipment (UE) in a shared radio frequency spectrum band, comprising:
   identifying at least one downlink channel monitoring occasion;
   receiving, at the UE, a feedback trigger for transmission of hybrid automatic repeat request (HARQ) feedback;
   determining a HARQ acknowledgement (ACK) codebook size based at least in part on a number of configured HARQ processes, on the downlink channel monitoring occasions, or a combination thereof, wherein each configured HARQ process comprises a corresponding number of code block group or transport block level ACK bits based at least in part on the configuration of the configured HARQ process; and
   transmitting the HARQ feedback in accordance with the HARQ ACK codebook size.

9. The method of claim 8, further comprising:
   populating the HARQ feedback based at least in part on the ACK delay indication and receipt of the downlink channel.

10. The method of claim 9, wherein populating the HARQ feedback comprises:

populating the HARQ feedback using decoding results when an ACK ready time for the downlink channel is less than an ACK transmission time, wherein the ACK ready time is a function of the ACK delay indication.

11. The method of claim 10, wherein populating the HARQ feedback comprises:
populating the HARQ feedback based at least in part on determining that a downlink channel monitoring occasion occurs before the ACK ready time.

12. The method of claim 9, wherein populating the HARQ feedback comprises:
populating the HARQ feedback using default values when an ACK ready time for the downlink channel is greater than an ACK transmission time.

13. The method of claim 9, wherein populating the HARQ feedback with default values comprises:
populating the HARQ feedback using an ACK value, a negative ACK (NACK) value, or a previous ACK/NACK value.

14. The method of claim 8, further comprising:
identifying a duration for the HARQ feedback to be reported;
identifying a subset of downlink channel monitoring occasions within the duration for the HARQ feedback to be reported; and
determining the HARQ ACK codebook size based at least in part on the number of downlink channel monitoring occasions in the subset.

15. The method of claim 14, wherein a control message received in downlink control information indicates whether the subset of downlink channel monitoring occasions comprises an ACK transmission time, whether the subset comprises different channel monitoring occasions, or a combination thereof.

16. The method of claim 15, wherein the ACK transmission time comprises a sum of data transmission time and an ACK delay value, the ACK delay value conveyed in a downlink grant corresponding to the current ACK transmission.

17. The method of claim 15, wherein the message comprises an explicit indication received in downlink control information.

18. The method of claim 15, wherein the message comprises an implicit indication based at least in part on comparing a HARQ feedback parameter conveyed in downlink control information with a parameter conveyed in radio resource control.

19. The method of claim 14, wherein the duration of the downlink channel monitoring occasion is based at least in part on:
receiving, during a transmission opportunity (TxOp) in which a downlink channel monitoring occasion is to occur but before the downlink channel monitoring occasion occurs, information from which the UE is able to determine the duration of the downlink channel monitoring occasion.

20. The method of claim 14, wherein determining the HARQ ACK codebook size comprises:
receiving, in downlink control information, an indication of the number of downlink channel monitoring occasions to include in determining the HARQ ACK codebook size.

21. The method of claim 14, wherein determining the HARQ ACK codebook size comprises:
receiving, in downlink control information, an indication of a set of downlink channel monitoring occasions to include in determining the HARQ ACK codebook size, wherein the set is one of a plurality of predefined sets of downlink channel monitoring occasions.

22. The method of claim 21, further comprising:
receiving the plurality of predefined sets of downlink channel monitoring occasions via radio resource control (RRC) signaling.

23. The method of claim 14, wherein the HARQ ACK codebook size encompasses a number of transmission time intervals (TTIs), wherein at least some of the number of TTIs are non-contiguous.

24. The method of claim 23, wherein the number of TTIs encompassed by the HARQ ACK codebook size spans two different transmission opportunities (TxOps).

25. The method of claim 14, further comprising:
determining the HARQ ACK codebook size based at least in part on the duration of the downlink channel monitoring occasion for a first set of HARQ feedback instances of the HARQ feedback; and
determining the HARQ ACK codebook size based at least in part on a number of configured HARQ processes for a second set of HARQ feedback instances of the HARQ feedback.

26. The method of claim 25, further comprising:
receiving a feedback trigger that indicates whether the HARQ ACK codebook size determination is to be based on the duration of the at least one downlink channel monitoring occasion or on the number of configured HARQ processes.

27. The method of claim 14, wherein the number of downlink channel monitoring occasions are identified based at least in part on a time location of the HARQ feedback.

28. The method of claim 14, wherein receiving the feedback trigger comprises:
receiving a trigger for HARQ feedback in DCI for all of the configured HARQ processes or a subset of the configured HARQ processes for the UE via radio resource control (RRC) signaling.

29. The method of claim 28, wherein the subset of the configured HARQ processes comprises a bitmap indication with each bit in the bitmap corresponding to one HARQ process or a group of HARQ processes.

30. An apparatus for wireless communication at a user equipment (UE) in a shared radio frequency spectrum band, comprising:
a processor;
memory in electronic communication with the processor; and
instructions stored in the memory and executable by the processor to cause the apparatus to:
receive, at the UE, a downlink grant scheduling a downlink channel to be received by the UE;
identify, in association with the downlink grant, an acknowledgement (ACK) delay indication, wherein the ACK delay indication indicates a minimum time by which hybrid access request (HARQ) feedback is to be delayed after receiving the downlink data channel;
receiving, at the UE, the downlink data channel;
determine whether to transmit HARQ feedback for the downlink channel based at least in part on a value of the ACK delay indication; and
transmitting the HARQ feedback based at least in part on the determination.

* * * * *